United States Patent
Sher

(10) Patent No.: US 10,475,093 B2
(45) Date of Patent: Nov. 12, 2019

(54) ELECTRONIC BILL PAY AND BILL PRESENTMENT ACCOUNT NUMBER TREATMENT SYSTEM AND METHOD

(75) Inventor: Darrell Sher, San Francisco, CA (US)

(73) Assignee: WELLS FARGO BANK, N.A., San Francisco, CA (US)

(*) Notice: Subject to any disclaimer, the term of this patent is extended or adjusted under 35 U.S.C. 154(b) by 785 days.

(21) Appl. No.: 13/620,576

(22) Filed: Sep. 14, 2012

(65) Prior Publication Data

US 2013/0018786 A1 Jan. 17, 2013

Related U.S. Application Data

(62) Division of application No. 11/344,325, filed on Jan. 30, 2006.

(60) Provisional application No. 60/648,218, filed on Jan. 28, 2005.

(51) Int. Cl.
*G06Q 30/04* (2012.01)
*G06Q 40/00* (2012.01)

(52) U.S. Cl.
CPC .......... *G06Q 30/04* (2013.01); *G06Q 40/00* (2013.01)

(58) Field of Classification Search
CPC ............................. G06Q 30/04; G06Q 40/00
USPC .......................................................... 705/64
See application file for complete search history.

(56) References Cited

U.S. PATENT DOCUMENTS

| | | |
|---|---|---|
| 5,326,959 A | 7/1994 | Perazza |
| 5,465,205 A | 11/1995 | Kamiya |
| 5,671,279 A | 9/1997 | Elgamal |
| 5,812,668 A | 9/1998 | Weber |
| 5,850,446 A | 12/1998 | Berger et al. |
| 5,889,863 A | 3/1999 | Weber |
| 5,920,847 A | 7/1999 | Kolling et al. |
| 5,963,925 A * | 10/1999 | Kolling ............ G06Q 20/00 705/26.1 |
| 5,970,480 A | 10/1999 | Kalina |
| 5,978,840 A | 11/1999 | Nguyen et al. |
| 5,983,208 A | 11/1999 | Haller et al. |
| 5,987,132 A | 11/1999 | Rowney |

(Continued)

FOREIGN PATENT DOCUMENTS

EP  1 463 012  9/2004

OTHER PUBLICATIONS

Anderson, R.J., "UEPS—A Second Generation Electronic Wallet", Computer Security—ESORICS 92. Second European Symposium on Research in Computer Security Proc. 1992, Berlin, West Germany.

(Continued)

*Primary Examiner* — James D Nigh
(74) *Attorney, Agent, or Firm* — Foley & Lardner LLP

(57) ABSTRACT

A technique is provided that transforms account number data received from the consumer into one or more forms based on use by specific processes. Further provided is a technique for establishing payees using these account numbers such that remittances can be routed via the most cost effective means, e.g. which remittance processor is determined and/or which processor among internal processors within an enterprise is determined, and such that, when available, electronic bills can be successfully requested for on-line presentation. The technique to transform account number data can be applied by systems in industries other than banking and for account numbers from sources other than a customer.

9 Claims, 16 Drawing Sheets

(56) References Cited

U.S. PATENT DOCUMENTS

| | | | |
|---|---|---|---|
| 5,987,140 A | 11/1999 | Rowney et al. | |
| 5,999,908 A | 12/1999 | Abelow | |
| 6,002,767 A | 12/1999 | Kramer | |
| 6,029,150 A | 2/2000 | Kravitz | |
| 6,061,665 A | 5/2000 | Bahreman | |
| 6,072,870 A | 6/2000 | Nguyen et al. | |
| 6,094,684 A * | 7/2000 | Pallmann | G06F 9/54 709/227 |
| 6,119,105 A | 9/2000 | Williams | |
| 6,163,772 A | 12/2000 | Kramer et al. | |
| 6,178,409 B1 | 1/2001 | Weber et al. | |
| 6,253,027 B1 | 6/2001 | Weber et al. | |
| 6,289,323 B1 | 9/2001 | Gordon et al. | |
| 6,324,522 B2 | 11/2001 | Peterson et al. | |
| 6,324,525 B1 | 11/2001 | Kramer et al. | |
| 6,327,577 B1 | 12/2001 | Garrison et al. | |
| 6,332,126 B1 | 12/2001 | Peirce et al. | |
| 6,334,111 B1 | 12/2001 | Carrott | |
| 6,373,950 B1 | 4/2002 | Rowney | |
| 6,408,284 B1 * | 6/2002 | Hilt | G06Q 20/02 705/40 |
| 6,427,132 B1 | 7/2002 | Bowman-Amuah | |
| 6,430,539 B1 | 8/2002 | Lazarus et al. | |
| 6,885,857 B1 | 4/2005 | Hanson | |
| 2002/0013768 A1 * | 1/2002 | Ganesan | G06Q 20/04 705/40 |
| 2002/0128967 A1 | 9/2002 | Meyer et al. | |
| 2004/0044607 A1 * | 3/2004 | Hedrick, Jr. | G06Q 10/10 705/35 |
| 2004/0049457 A1 * | 3/2004 | Garrison | G06Q 20/04 705/40 |
| 2005/0097050 A1 * | 5/2005 | Orcutt | G06Q 20/042 705/45 |
| 2005/0222952 A1 * | 10/2005 | Garrett | G06Q 20/102 705/40 |
| 2006/0165060 A1 * | 7/2006 | Dua | G06Q 20/20 370/352 |

OTHER PUBLICATIONS

Brown L., et al. "Improving Resistance to Differential Cryptanalysis and the Redesign of LOKI", Technical Report CA38/91. Australia.

Davis, M.E., "Implementing a Global Electronic Commerce Product", IEMC '98 Proc. Intl. Conf. on Eng. and Tech. Management, IEEE, 1998, New York.

Final Office Action on U.S. Appl. No. 11/344,325, dated Mar. 16, 2010, 20 pages.

Jakobsson, M., "Ripping Coins for a Fair Exchange", Dept. of Computer Science and Engineering., Univ. of California, San Diego, LA Jolla, California.

Neuman, B.C., et al., "Requirements of Network Payment: the NetCheque Perspective", Proceedings of IEEE Compcon '95, Mar. 1995, San Francisco.

Non-Final Office Action on U.S. Appl. No. 11/344,325, dated Jul. 8, 2009, 20 pages.

Wheelwright, G., "Your Money Where Your Mouse Is", Communications International, vol. 23, No. 11, EMAP Computing, Nov. 1996, UK.

Wright, D., "Comparative Evaluation of Electronic Payment Systems", INFOR vol. 40, No. 1, Canadian Oper. Res. Soc. Canadian Inf. Process. Soc. Feb. 2002, Canada.

Non-Final Office Action on U.S. Appl. No. 11/344,325, dated Mar. 5, 2014, 15 pages.

* cited by examiner

*FIG. 4*

Add Payee - Microsoft Internet Explorer

File  Edit  View  Favorites  Tools  Help

← Back  →  ⊗  ⟳  ⌂  | ⊙ Search  ⌷ Favorites  ⊙ Media  ⊙  | ⊟

Address  https://boris.wellsfargo.com:449/BillManager/plugin.nd/Payesss/pgRecvBills.106642896547|  ▼  → Go  Links »

| Account Summary | Transfer | Bill Pay | Services | Main Menu | Select a Destination |

Status Update   Make Payment   Reports
Bills   Pending Payments   User Profile
Payments   ▶ Add Payee   Notices
Payee Management

Add New Payee
Account information

Please enter the information as it appears on the bill.

⚠ Please enter your account number exactly as it appears on your paper bill.

⚠ Please enter your account number exactly as it appears on your paper bill. 1

⚠ Please note: You will receive a statement in the mail. 1

If you dont qualify for the above condition(s), you can still add this page but you will not be able to view the electronic version of your bill online.

Customer's Account Number With This Payee   Payee Nickname
[                    ]   [WELLS FARGO HOME]

Customer's Name as it Appears on the Bill:
First Name   Last Name
[GEORGE]   [CLOONEY]

☑ Use my home address as the billing address

Billing Address Line 1
[855 Lurline drive]

Billing Address Line 2 (optional)
[                    ]

Billing Address City   
[SAN FRANCISCO]

Billing State   Billing Zip Code
[CA ▼]   [94105]

Billing Country
[USA ▼]

¹Information from your payee or requested by your payee.

» Continue

Done                 Local Intranet

ELECTRONIC BILL PAY AND BILL PRESENTMENT ACCOUNT NUMBER TREATMENT SYSTEM AND METHOD

CROSS-REFERENCE TO RELATED APPLICATIONS

This application is a divisional of U.S. Ser. No. 11/344,325, entitled "Electronic bill pay and bill presentment account number treatment system and method," filed Jan. 30, 2006, which claims the benefit of U.S. Provisional Patent Application Ser. No. 60/648,218, entitled "E-bill account mask" filed on Jan. 28, 2005, both of which are incorporated herein in their entirety by reference.

BACKGROUND OF THE INVENTION

Technical Field

The invention relates to electronic payment over the Internet. More particularly, the invention relates to a system and method for enhancing bill payment and presentment services over the Internet by using a novel account number processing system and method.

Description of the Prior Art

Presently, some enterprises offer a combined electronic bill presentment (eBill) and payment service over the Internet. For example, Wells Fargo has a bill payment product and service system, referred to as Wells Fargo's Bill Pay, which can present bills from particular Merchants as well as send payments, i.e. remittances, to any Merchant or individual. The availability of an electronic bill is dependent on the pass/fail of the Customer's entered account number matched against the Merchant provided account masks. Which method of remittance and which route for a remittance are also determined by the pass/fail of the Customer's entered account number matched against the Merchant provided account masks. Along with the account activation, the Customer's screen navigation flow is also dependent on the pass/fail of account mask tests.

The account masks provided by a Merchant for eBills and remittances are not always the same. This can occur for example when a Merchant uses multiple accounting systems and not all account statements and bills are available electronically but the Merchant can receive remittances for all accounts. Merchants provide updated account masks to Wells Fargo on a daily basis.

Bill Pay was experiencing a high rate of account mask failures when Customers were adding Payees to send remittances to and/or attempting to activate eBills. Preliminary research indicates that the issues are primarily the result of how Customers are entering their account numbers when adding Payees. Apparently, Customers are not following the instructions that appear on Add Payee screens when adding account information, specifically the account number, leading to the high level of eBill activation rejections and remittances routed less than optimally.

Some systems attempt to solve similar problems. For example, D. L. Garrison, P. A. Kight, B. Perkins, C. L. Ward, M. E. Lawson, and A. L. Kerin, Electronic Bill Payment System with Account-Number Scheming, U.S. Pat. No. 6,327,577 B1 (Dec. 4, 2001) teaches a technique for validating a submitted consumer's account number; a technique that tries to ensure that consumer payments are remitted to the proper one of multiple remittance centers associated with the same; and a technique that transforms payment data received from the consumer into a form compatible with a merchant's accounting system.

G. A. Kramer and J. C. Weber, Settlement of Aggregated Electronic Transactions Over a Network, U.S. Pat. No. 6,324,525 B1 (Nov. 27, 2001 teaches one technique by which messages flow over the Internet directly from a merchant to card issuers, thereby bypassing the merchant's acquirer altogether and another technique. Another method is taught for consummating a series of electronic transactions between a first electronic device, such as an acquirer device, and a second electronic device, such as an issuer device, and a plurality of electronic terminals, such as a plurality of merchant terminals of different merchants, includes establishing a communication between the plurality of devices and terminals and accumulating transactions that are approved by the second electronic device. Then, periodically the series of transactions are settled using a transfer of monetary value between the first electronic device and the second electronic device.

D. W. Kravitz, Payment and Transactions in Electronic Commerce System, U.S. Pat. No. 6,029,150 (Feb. 22, 2000) teaches a method of payment in an electronic commerce system wherein customers have accounts with an agent and where each customer shares a respective secret between that customer and the agent. This secret is set up prior to the actual transaction or payment and, in preferred embodiments, is a dynamic secret. Kravitz states that a problem with payment systems that make an instantaneous payment to merchants is that if a fraudulent merchant is accepting many fraudulent transactions, he might not be detected until he had already received much money and that it is desirable to provide a payment system that is non-appealable, does not need extensive records, is relatively anonymous for the consumer, and adequately deals with micropayments to individual merchants.

Also, W. R. McMichael and C. W. Kozee, A Reduced Communication Technique for Matching Electronic Billers and Consumers, European Patent Application No. EP 1 463 012 A2 (Sep. 29, 2004) discusses a technique for identifying an association between a consumer and an electronic biller. A biller transmits customer demographic data to an identity service. The identity service generates a first entity identifier based upon the received customer demographic data. The first entity identifier does not reveal any customer demographic information. The identity service transmits the generated first entity identifier and a biller identifier to an electronic bill presentment service. The presentment service transmits consumer demographic to the identity service. The identity service generates a second entity identifier based upon the received consumer demographic data and transmits the generated second entity identifier to the presentment service. The second entity identifier does not reveal any consumer demographic information. After receipt of the first and second entity identifiers and the biller identifier, the presentment service identifies an association between the consumer and the biller and transmits a notice of the association.

However, none of the prior art provides a technique that solves the problems solved by the invention described herein. None of the prior art solves the problem of electronic payment system account number rejections in the manner of the claimed invention.

In view of the discussion hereinabove, it therefore would be advantageous and desirable to provide:

a unique combination of selectable account cleansing, also referred to herein as account handling, capabilities;
 the ability to specify different sets of account cleansing capabilities based on the targeted Merchant and the intended use of the payee, i.e. for remittance processing or for combined remittance processing and electronic bill presentment;

the ability to use the account cleansing capabilities to transform account number data received from the consumer into multiple forms of an account number for use by specific processes, i.e. display, mask matching, remittances, and electronic bill presentment;

a global trim rule to handle leading and trailing spaces for all customer entered account numbers;

a new second pass of account mask routines if the system cleansed account numbers do not pass the applicable account masks;

a screen navigation change to allow for Customer re-try of an account number that fails a Merchant account mask;

a screen content change to assist users when re-entering account numbers after an account mask failure; and a report to assist the Bill Pay administrators in the creation and maintenance of the account cleansing rules.

It further would be advantageous to provide a technique for enhancing or improving routing capabilities between multiple payment processors.

It further would be advantageous to provide a Scrub and Match process that extends the account number handling method and an Automated Redirections process that improves routing efficiency.

It further would be advantageous to provide a system and method that accepts as input that which the customer entered and, having incorporated the customer input into a token, such as a flexible string variable, associates the token with one of the merchants in a list of merchants. This functionality is referred to herein as Scrub & Match.

It further would be advantageous to provide a system and method that allows an administrator of a bill pay system to change the processor payee that the enterprise's customer's payees are associated with, which results in changing how payment remittances are routed and is referred to herein as Auto Redirections.

SUMMARY OF THE INVENTION

A technique is provided that transforms account number data received from the consumer into one or more forms based on use by specific processes. Further provided is a technique for establishing payees using these account numbers such that remittances can be routed via the most cost effective means, e.g. which remittance processor is determined and/or which processor among internal processors within an enterprise is determined, and such that, when available, electronic bills can be successfully requested for on-line presentation. The technique to transform account number data can be applied by systems in industries other than banking and for account numbers from sources other than a customer.

BRIEF DESCRIPTION OF THE DRAWINGS

FIG. 4 is a screen print of an Account Info for eBill (consumer) screen according to the invention;

FIG. 5 is a screen print of an Account Info for eBill (business) screen according to the invention;

FIG. 6 is a screen print of a Payment Options for Online Bill (manual option) screen according to the invention;

DETAILED DESCRIPTION OF THE INVENTION

Figure 1:
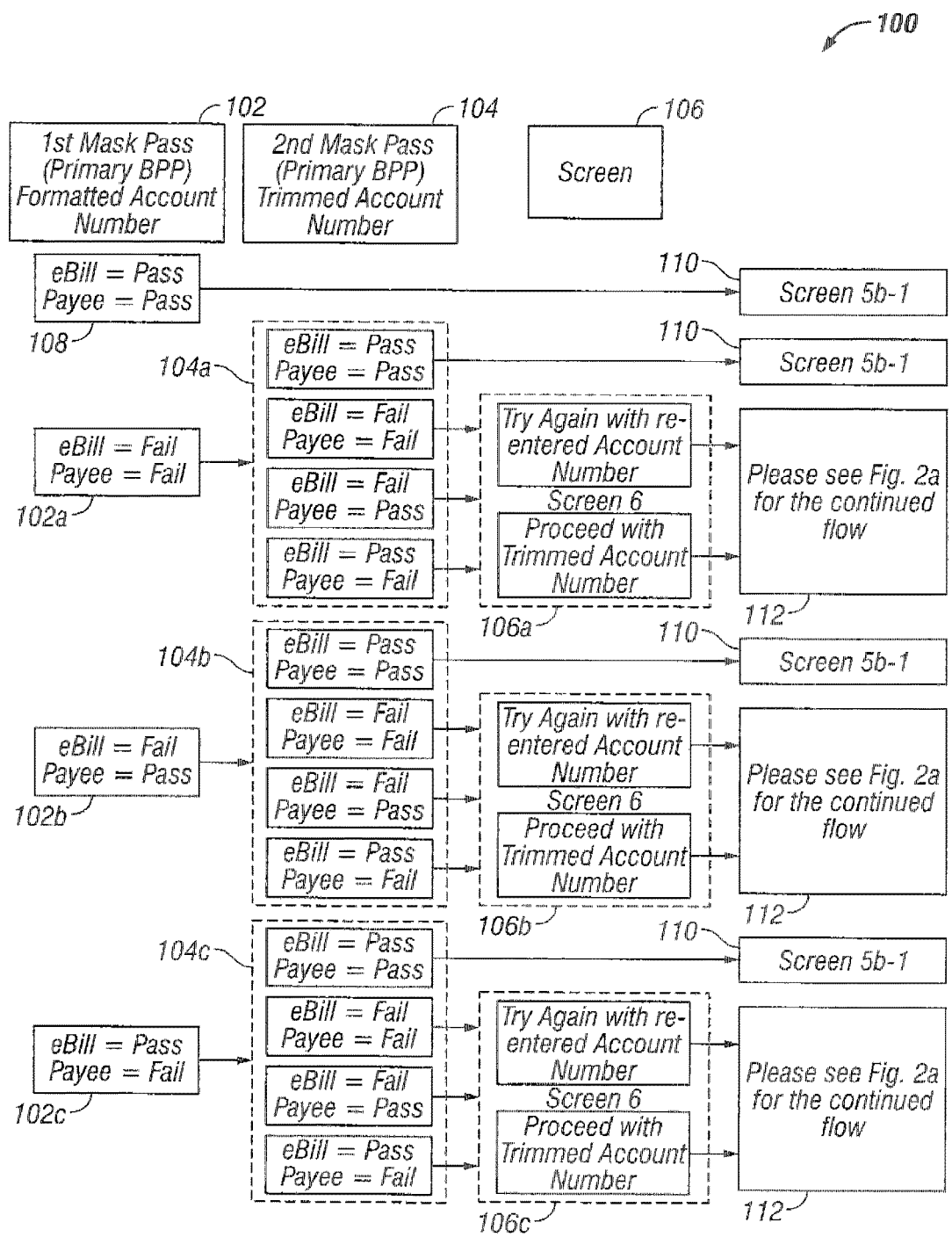
FIG. 1 is a schematic flow diagram of first and second pass functionality 100 according to the invention.

A technique is provided that transforms account number data received from the consumer into one or more forms based on use by specific processes. Further provided is a technique for establishing payees using these account numbers such that remittances can be routed via the most cost effective means, e.g. which remittance processor is determined and/or which processor among internal processors within an enterprise is determined, and such that, when available, electronic bills can be successfully requested for on-line presentation. The technique to transform account number data can be applied by systems in industries other than banking and for account numbers from sources other than a customer.

It should be appreciated that account handling and account cleansing have the same meaning herein and are used herein interchangeably.

In one embodiment of the invention, for each Merchant, the system and method provides the ability to enter and store two sets of account number cleansing instructions, described in detail hereinbelow under the section, Account Number Cleansing Methods. One set is intended for use when customers are remitting money to a merchant and not requesting to receive eBills from this merchant. The other set is used when electronic bills presentment (eBills) is available from this merchant and the customer elects to both remit money to and requests to receive eBills from this merchant. Electronic bills presentment is a service provided jointly by the Merchant and by the enterprise, where the Merchant can send billing data electronically to the enterprise to provide, e.g. display, to the customer. In the first pass when no cleansing instructions are provided or in the second pass after the cleansed account number fails the account masks in the first pass, leading and trailing spaces are trimmed from the account number as entered by the customer and that form of the account number is used for all subsequent processing.

The first set of cleansing instructions, used when customers are only remitting money to the merchant, consists of three account cleansing instructions, each producing its own form of the account number. The resulting three forms of the account number may or may not be the same. The first form is used to display the account number back to the customer. The second form is used to match to the merchant supplied masks and to determine to which processor the remittances are routed. The third form associated with the remittances sent to the merchant and is embedded in the remittance itself.

The second set of cleansing instructions, used when the customer elects both to remit money to and to receive eBills from this merchant, consists of four account cleansing instructions, each producing its own form of the account number. The resulting four forms of the account number may or may not be the same. The first form is used to display the account number back to the customer. The second form is used to try to match the merchant supplied masks and to determine how remittances are routed. The third form is associated with the remittances sent to the merchant and can be embedded in such remittances. The fourth form is used to request the merchant to start to produce and send an electronic form of the customer's bill for presentation, a process referred to herein as account activation.

Employing these account cleansing mechanisms improves the match rate on account masks, leading to a decrease in the level of account mask failures. This enables the enterprise's remittance system to optimally route remittances, thereby reducing the operating costs of the system and to improve the customer experience by increasing the opportunity of a customer to receive electronic bills to their convenience.

Figure 12:
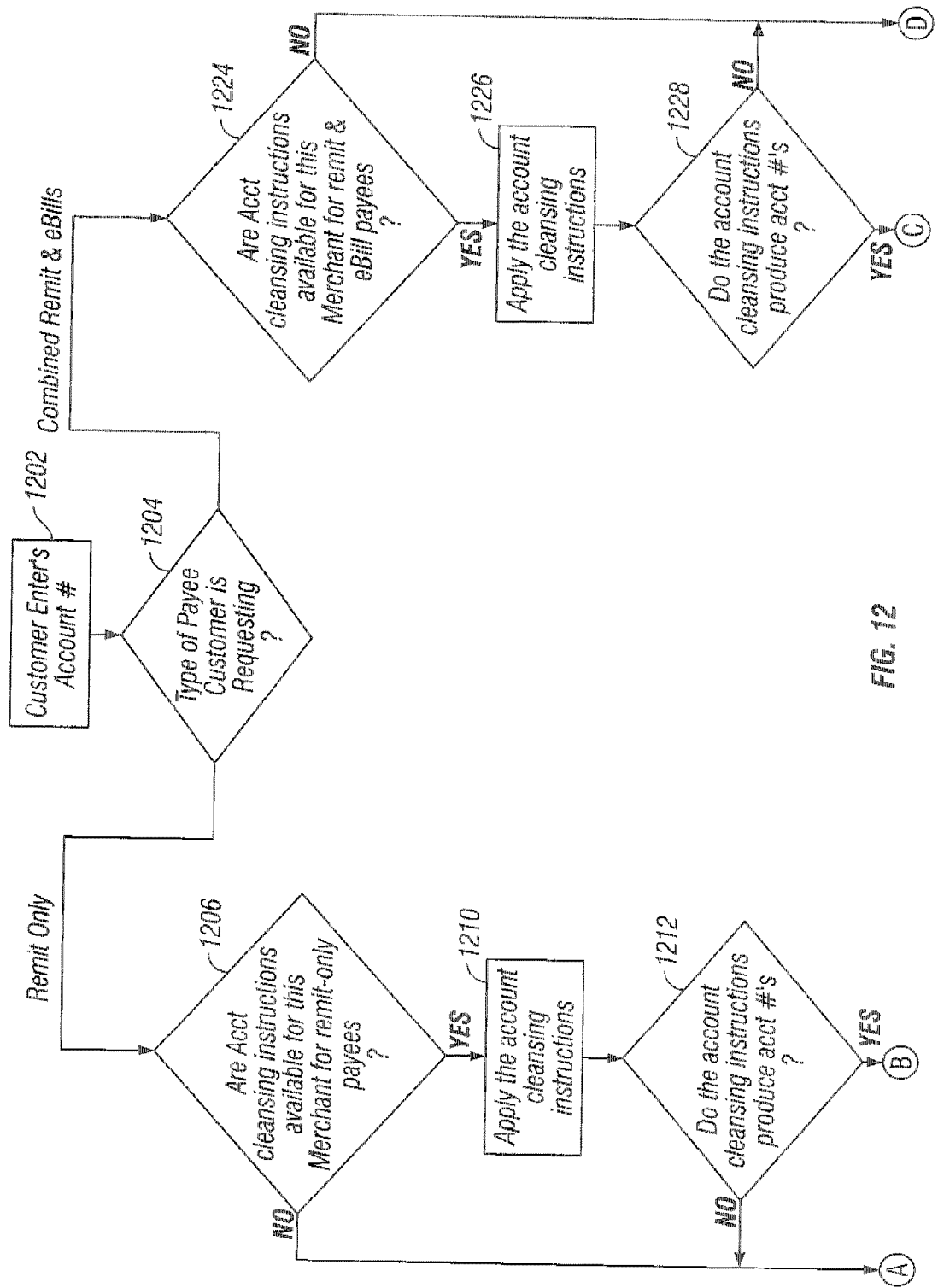
FIG. 12 is a flow diagram for payee creation and eBill activation according to the invention.
Figure 12:
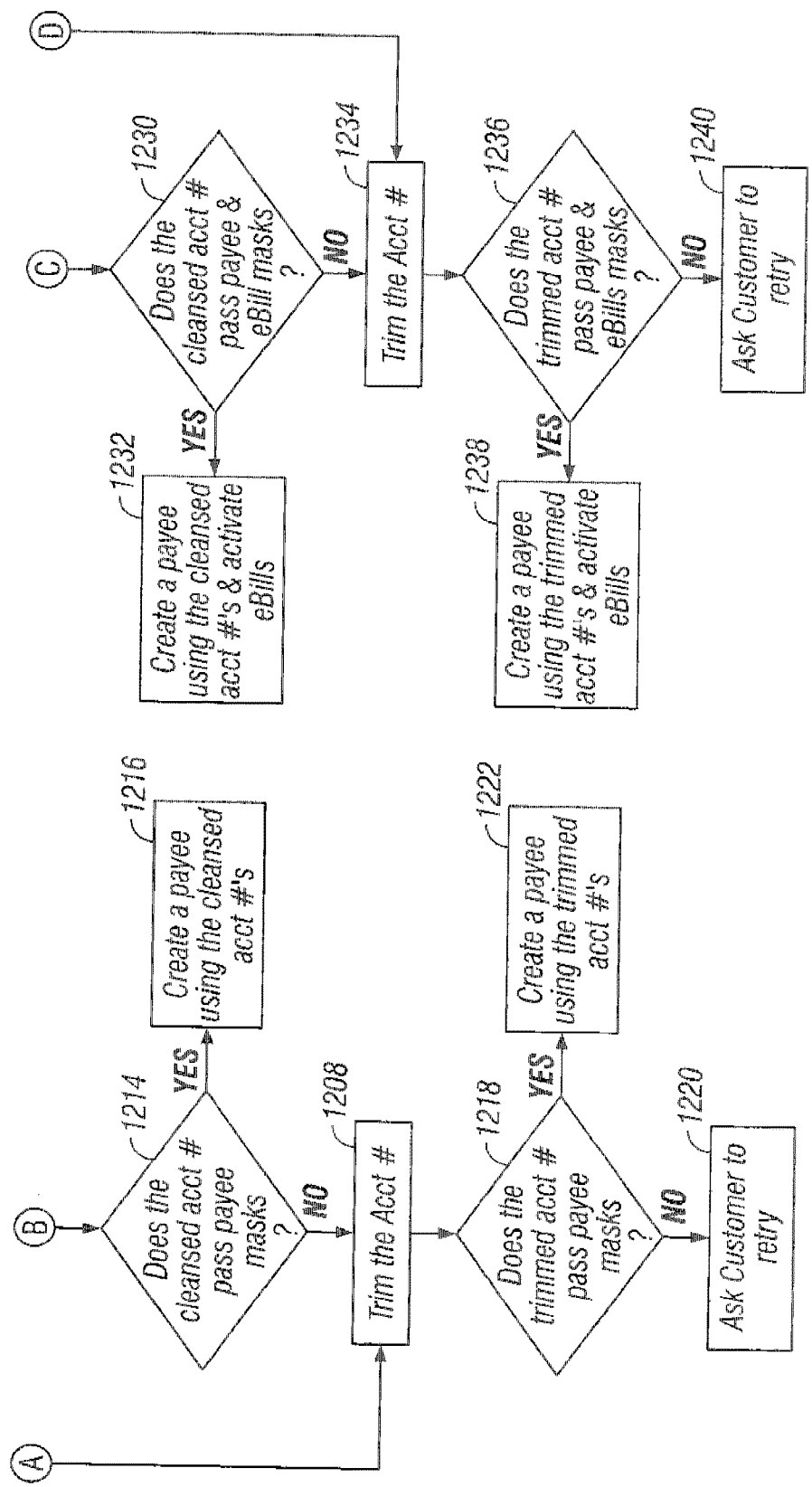

One embodiment of the invention can be described with reference to FIG. 12, a flow diagram for payee creation and eBill activation. While the flow chart depicts entities such as customer, payee mask, eBill mask, and two types of payee the customer, it should be appreciated that this system and method can be applied to any industry having any source for the account number, any type of mask, and any type of target and still be within the scope and spirit of the invention.

An account number is entered, shown here by a customer (1202). It is determined whether the payee that the customer is requesting is a remittance only payee or a combined remittance and eBill (1204). If the type of payee is for remittances only, then it is determined if account number cleansing instructions for the particular Merchant are available (1206). If not, then the account number is trimmed (1208). If yes, then the account number cleansing instructions are applied (1210). Then it is determined if the account number cleansing instructions produce cleansed account numbers (1212). If not, then the account number is trimmed (1208). If yes, then it is determined if then cleansed account numbers pass the payee mask (1214). If not, then the account number is trimmed (1208). If yes, then a payee for that merchant is created using the cleansed account numbers (1216). When and after the account number is trimmed (1208), it is determined if the trimmed account number passes the payee mask (1218). If not, the customer is asked to re-try, including the customer re-entering the number or choosing other options (1220). If yes, then a payee is created using the trimmed account number (1222).

If the type of payee is for the combination of remittances and eBill activation or presentment, then it is determined if account number cleansing instructions for the particular Merchant for remittances and eBill payees are available (1224). If not, then the account number is trimmed (1234). If yes, then the account number cleansing instructions are applied (1226). Then it is determined if the account number cleansing instructions produce cleansed account numbers (1228). If not, then the account number is trimmed (1234). If yes, then it is determined if the cleansed account numbers pass the payee mask and the eBill masks (1230). If not, then the account numbers are trimmed (1234). If yes, then a payee for that merchant is created using the cleansed account numbers and eBills are activated (1232). When and after the account numbers are trimmed (1234), it is determined if the trimmed account numbers pass the payee mask and eBill masks (1236). If not, the customer is asked to re-try, including the customer re-entering the number or choosing other options (1240). If yes, then a payee is created using the trimmed account number and eBills is activated using the trimmed account number (1238).

Account Number Cleansing Methodology

According to one embodiment of the invention, customer entered account numbers are trimmed of leading and trailing spaces. A particular account number cleansing instruction is comprised of any combination of the following operations:
  changing the case of the characters to either upper or lower case;
  using the syntax of a regular expression, as follows:
    to define the set of valid characters; all others are removed; or
    to describe the elements of an account number that the system searches for and extracts, i.e. discarding all other input, as well as how to reassemble and format the resulting elements into an account number;
  adding characters, as follows:
    specifying a character to pad with, including padding to the right or padding to the left, and specifying the target length of the resulting account number; or
    specifying a set of characters and whether to use as a prefix or suffix.

Scrub & Match

Previously, when a customer adds a payee to a customer's customized list of payees through a Bill Pay system, such as that of Wells Fargo, no method for identifying whom the customer is attempting to pay existed. As a result, whatever the customer entered was typically remitted via check. The cost of a check is typically 4-8 times more expensive that an electronic remittance. Electronic remittances are primarily created when the customer picks a merchant off of a list in such a Bill Pay system and successfully adds the payee to the customer's own list of payees. In one embodiment of the invention, the Scrub and Match tool accepts as input that which the customer entered and, using a flexible string variable, associates it to one of the Merchants in the list of merchants, also referred to herein as a Pick list. In addition, Scrub and Match can customize the criteria based on a particular merchant and create a unique criteria for each merchant in the pick list.

Auto Redirections

In one embodiment of the invention, Auto Redirections is an application that allows users of the bill pay system to move payees from one end point processor to another. When a customer submits information to add a merchant through our system, a payee is created and is automatically associated depending upon the configuration in the Online Admin Tool to one of the member payment processors. Any payment that the customer initiates after adding such payee is sent to that associated payment processor. At times, it may be more beneficial to move this payee, e.g. for reasons of costs or payment velocity, to another payment processor. Automated Redirections allows users to achieve this objective.

Online Admin Tool

An embodiment of an Online Admin Tool, an application currently used to manage all of the merchants in the Pick list is provided. At a basic level, it allows an enterprise, such as Wells Fargo, to add merchants and update addresses and account masks in a bill payment system. Particularly unique is that it allows a user to set priority in terms to which payment processor to first send a given payment. Each payment processor has varying criteria for what it accepts. However, being first the first payment processor in line is an advantage and helps the enterprise to control its costs. The Online Admin Tool also allows an enterprise to control processes such as Scrub and Match, Automated Redirections, the Ebill Account Mask Handling Rules, and Payee Account Mask Handling rules, all discussed in further detail herein. Preferably, access to this tool is limited to a handful of people in a payee management operations team. The tool is configured for multiple payment processors instead of just one, thereby representing a significant cost savings opportunity.

An Exemplary eBAM Implementation

This section describes an exemplary implementation of the account handling rules and payee creation according to one embodiment of the invention. This implementation is described by way of example and is not meant to be limiting. One skilled in the art can readily apply the system and method to other embodiments and to other industries that rely on account numbers and be within the scope of the invention.

Table A hereinbelow presents a Glossary of terminology used herein.

TABLE A

Glossary

Account Mask: A text string which describes the attributes of the account number that the customer must enter to qualify for a particular eBill or payee.
Address Mask: The Pick list address the customer must select to qualify for that particular payment processor payee. Address masks are only used at the Payee level.
Biller (eBiller): When an electronic bill is available from a Merchant, there is an associated Biller tied to the Merchant. The Biller record provides the Terms & Conditions URL, validation tokens, hint text, restriction text, and eBiller account masks.
BPP: Bill Payment Processor. Accepts remittance (payments) on behalf of a payee.
BSP: Biller Service Provider. An organization that enables billers to present electronic bills online.
Customer Payee: Identifies a Merchant or individual and the customer's account number with that Merchant or individual.
eBill: Electronic Bill. Also referred to as an online bill.
Formatted Account Number: The Trimmed account number that has been further handled based on the defined account number handling rules for that Merchant.
Mask: An expression that is used to qualify a customer's account number for an enterprise service, e.g. payment remittances and bill presentment.
Merchant: The Merchant is the actual merchant name displayed on the pick list when using Option 1 on the Add New Payee screen (Option 1—Search our list to add your new payee), or after selecting one of the results from Option 2—Locate and add your new payee by selecting the first letter in the name.
Processor Payee: The identification/information, e.g. processor payee ID number, address, account and/or address masks, provided by the payment processor that identifies a Merchant at that processor.
Processor Payee Record (Payee): The identification/information, e.g. processor payee ID number, address, account and/or address masks, provided by the payment processor for a Merchant. A Merchant can be associated to many payees, including payees from multiple payment processors, see Example 1 below. Payees can also be associated to multiple Merchants, see Example 2 below.
Example 1:

| Merchant: | Chase Visa/Mastercard |
| Payees: | MVNT Payee 1—Chase Visa |
| | MVNT Payee 2—Chase MasterCard |
| | CheckFree Payee 1—Chase Visa |
| | CheckFree Payee 2—Chase MasterCard |

Example 2:

| Merchant 1: | Citibank Visa |
| Merchant 2: | Citibank Mastercard |
| Payee: | Citibank Visa/Mastercard associated to Merchant 1 & 2 |

Regular expression: A regular expression, sometimes abbreviated to "regex," is a way for a computer user or programmer to express how a computer program should look for a specified pattern in a string and then what the program is to do when each pattern match is found.
Restricted Merchant: A Merchant that is restricted by BPP. To activate an eBill for this Merchant, the customer's payee must be associated to the BPP indicated in the BSP table, the payee must be associated to the first order BPP in the BPP hierarchy.
Top Level Merchant: The Top Level Merchant is found when using Option 2 on the Add New Payee Screen, i.e. Option 2—Locate and add your new payee by selecting the first letter in the name. In Wells Fargo Bill Pay, this is typically the parent company name, e.g. Wells Fargo.
Trimmed Account Number: The account number that the Customer entered with any leading and trailing spaced removed.
Unrestricted Merchant: A Merchant that is not restricted by BPP. To activate an eBill for this Merchant, there is no BPP specification or restriction in the BSP table, therefore the customer is eligible to activate eBill as long as the customer's payee is associated to one of the BPPs.

Table B hereinbelow shows a Mapping of Screen numbers to Figure numbers used herein.

TABLE B

Figure 2A:
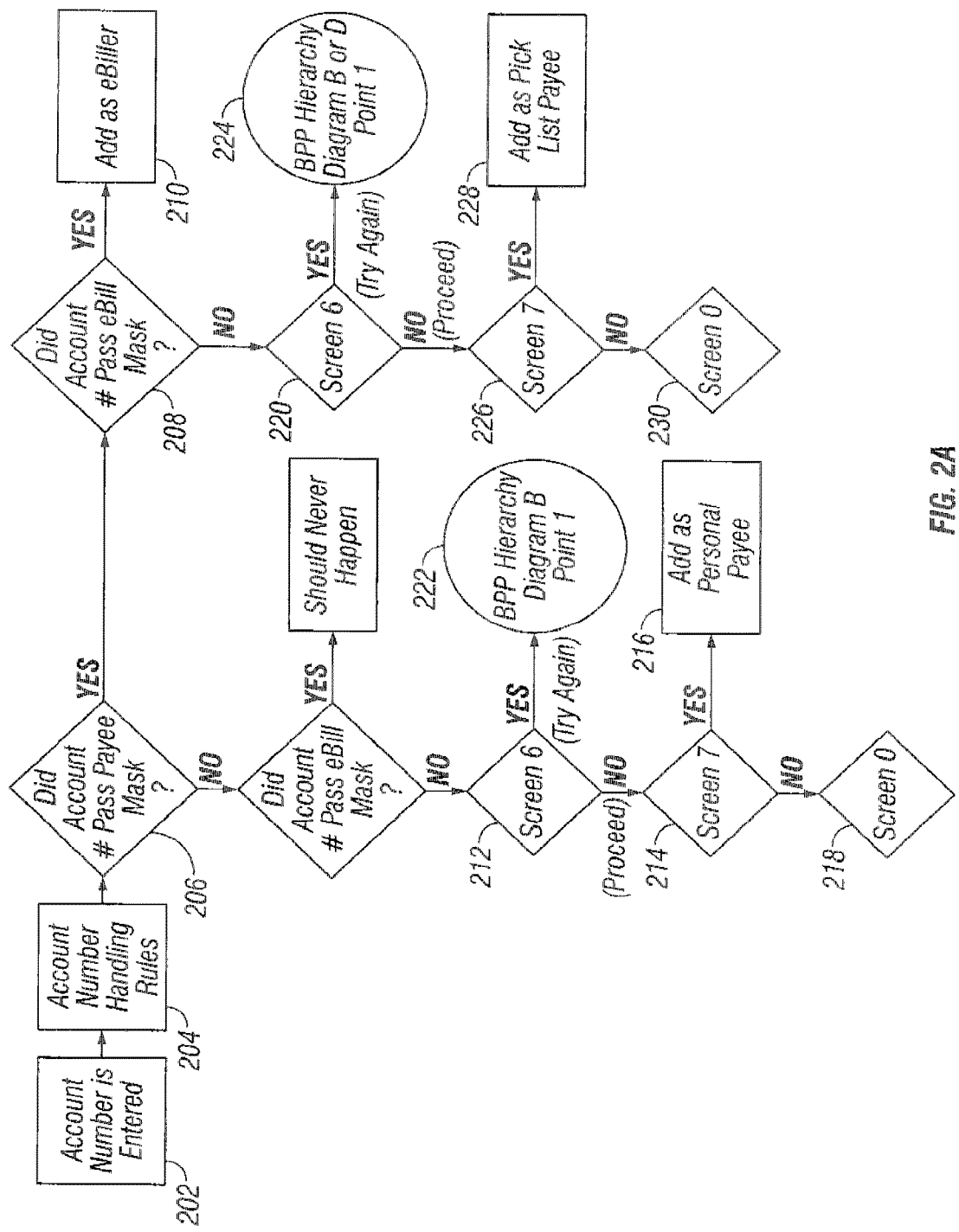
FIG. 2*a* is a continuation of the flow diagram of FIG. 1 for a restricted and unrestricted merchant path according to the invention.
Figure 2B:
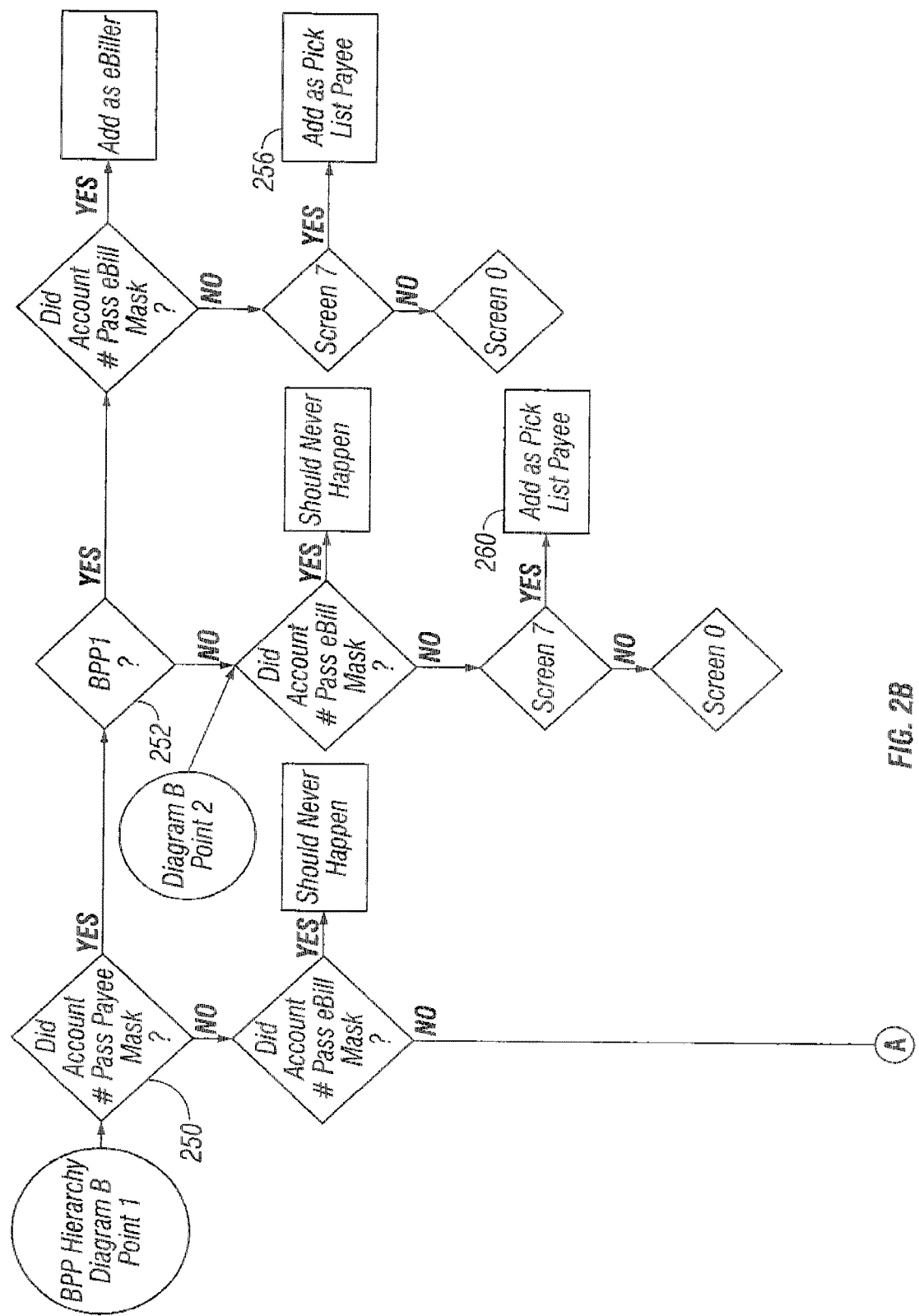
FIG. 2*b* is a continuation of the flow diagram of FIG. 2*a* for a restricted merchant path according to the invention.
Figure 2B:
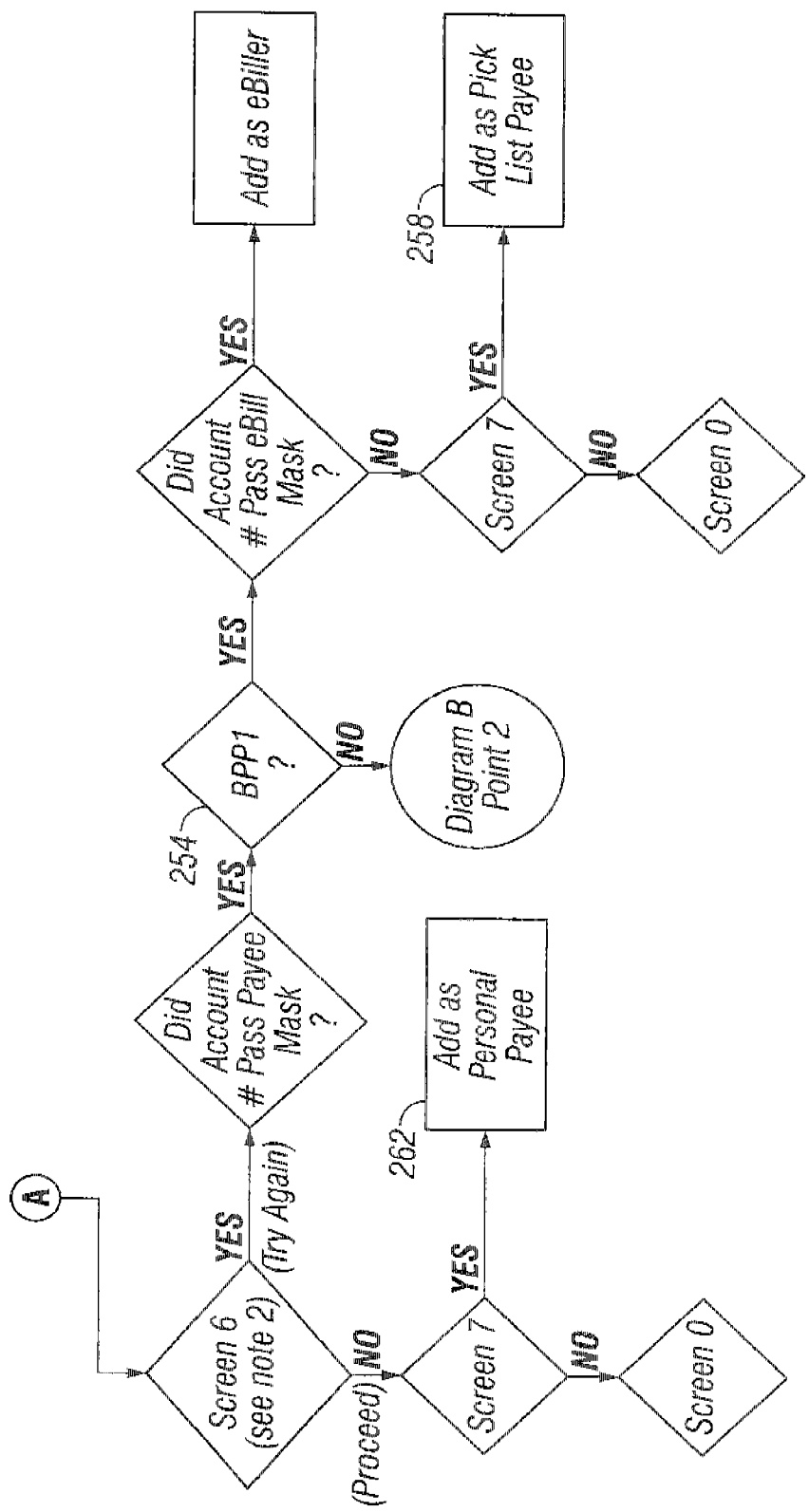
Figure 3:
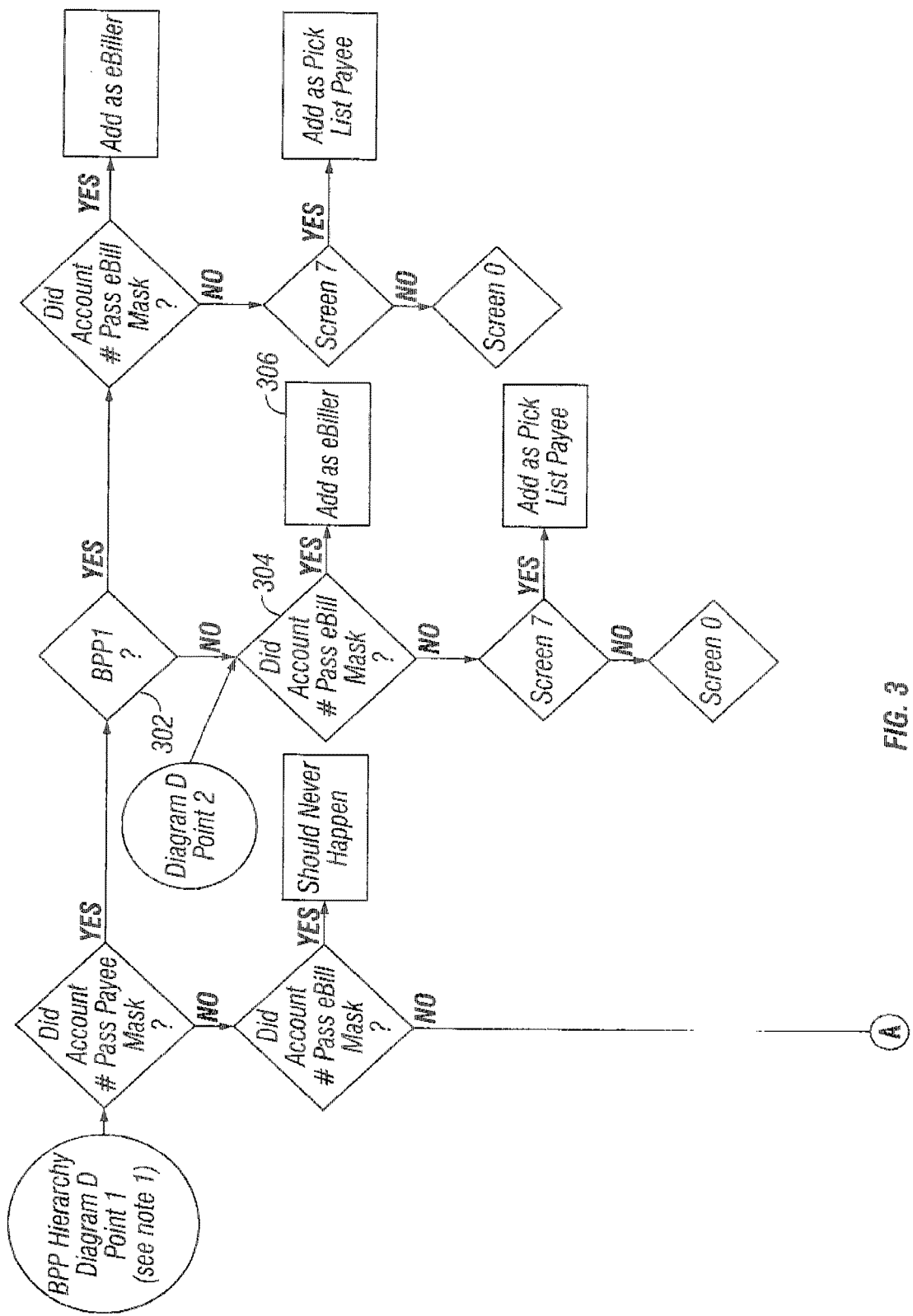
FIG. 3 is a continuation of the flow diagram of FIG. 2*a* for an unrestricted merchant path according to the invention.
Figure 3:
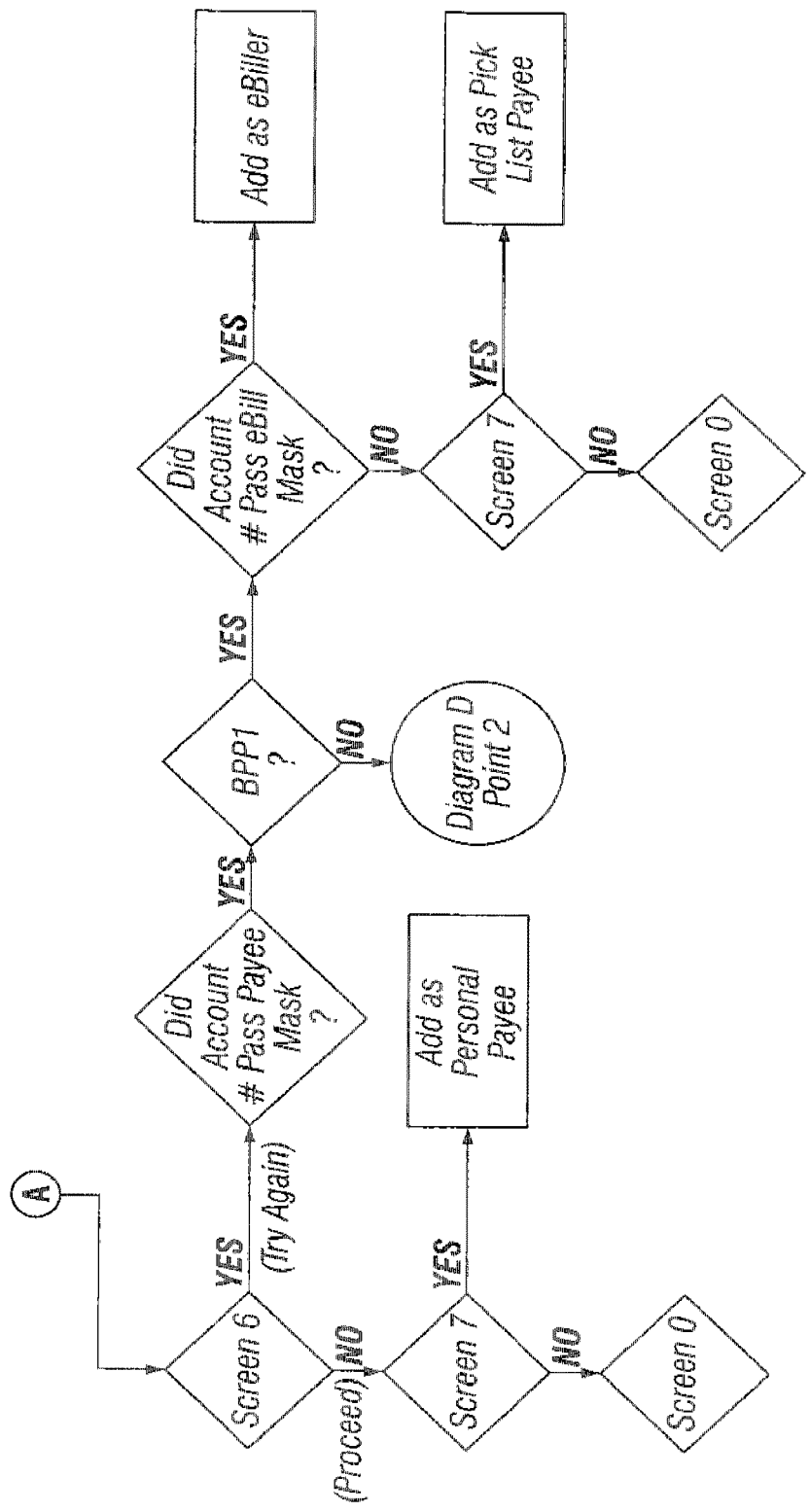
Figure 5:
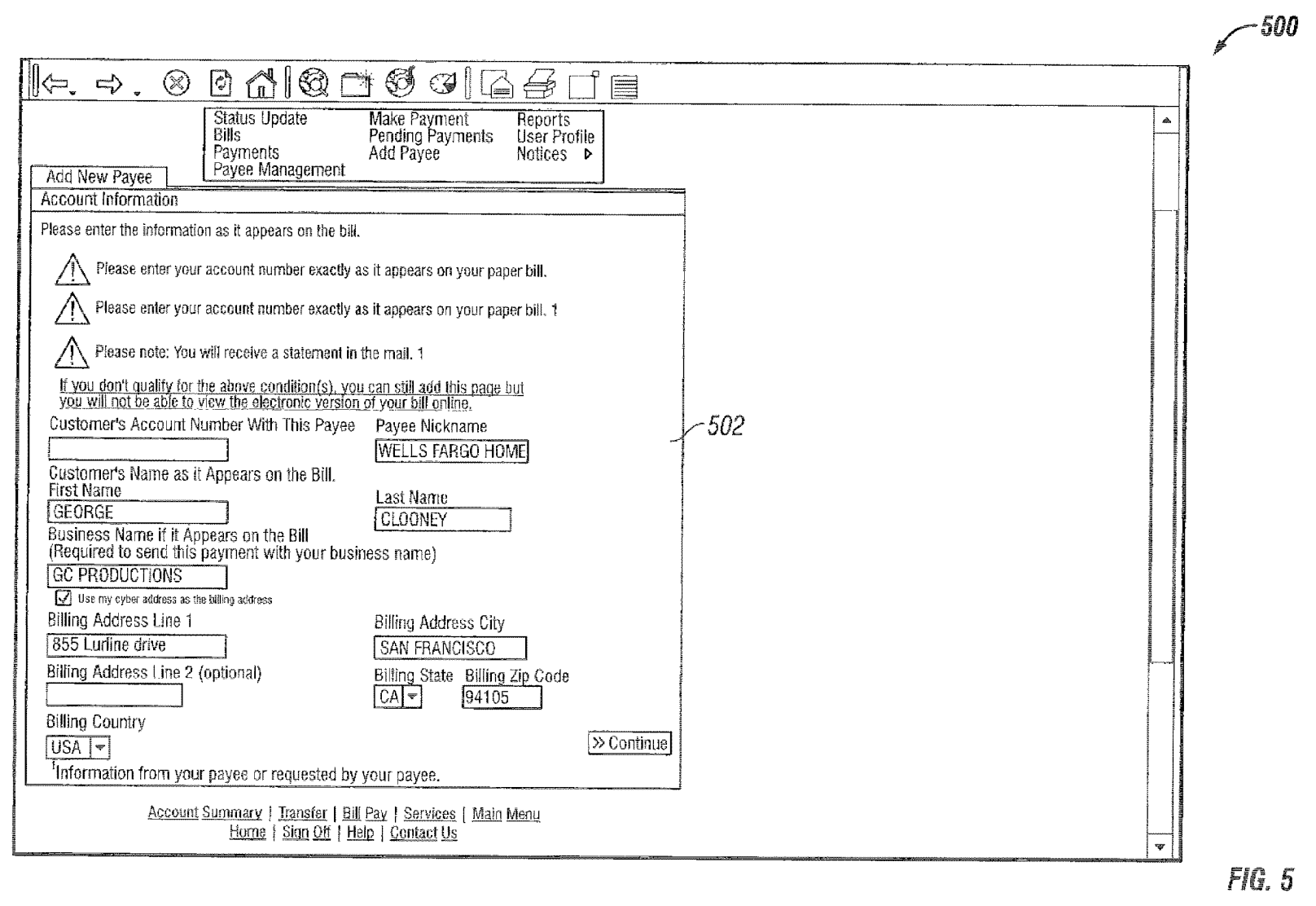
Figure 6:
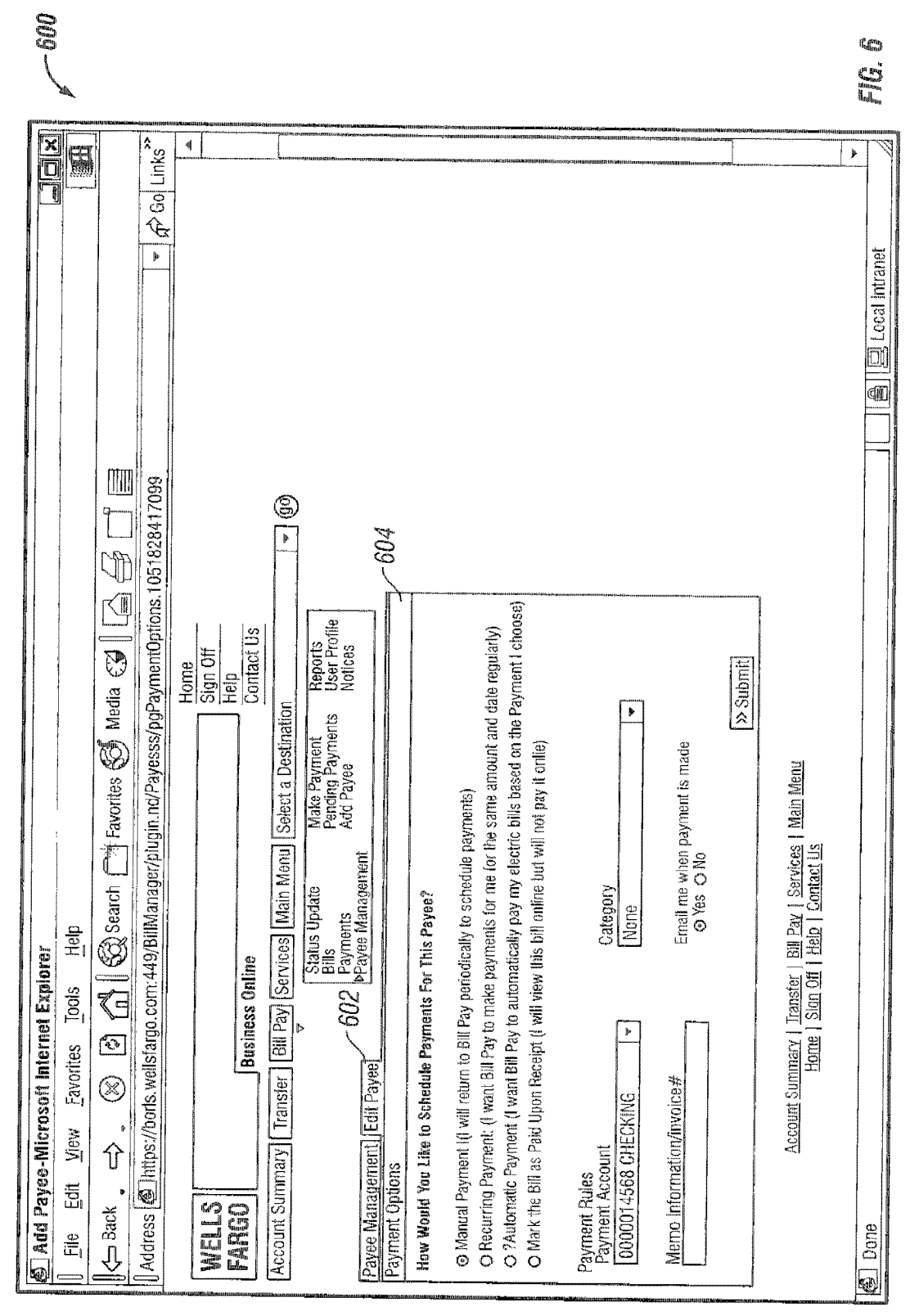
Figure 7:
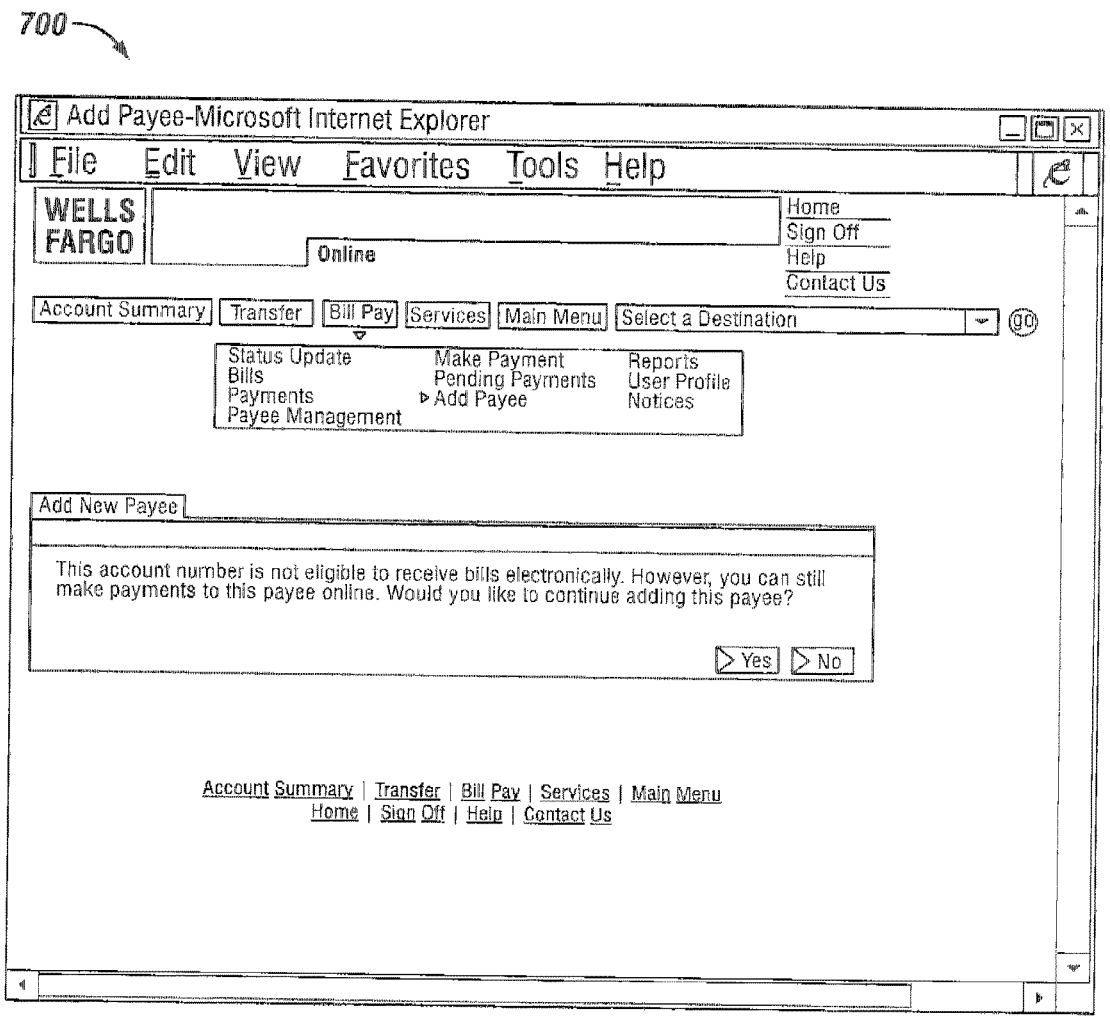
FIG. 7 is a screen print of a Account Not Eligible for ebill screen according to the invention.
Figure 8:
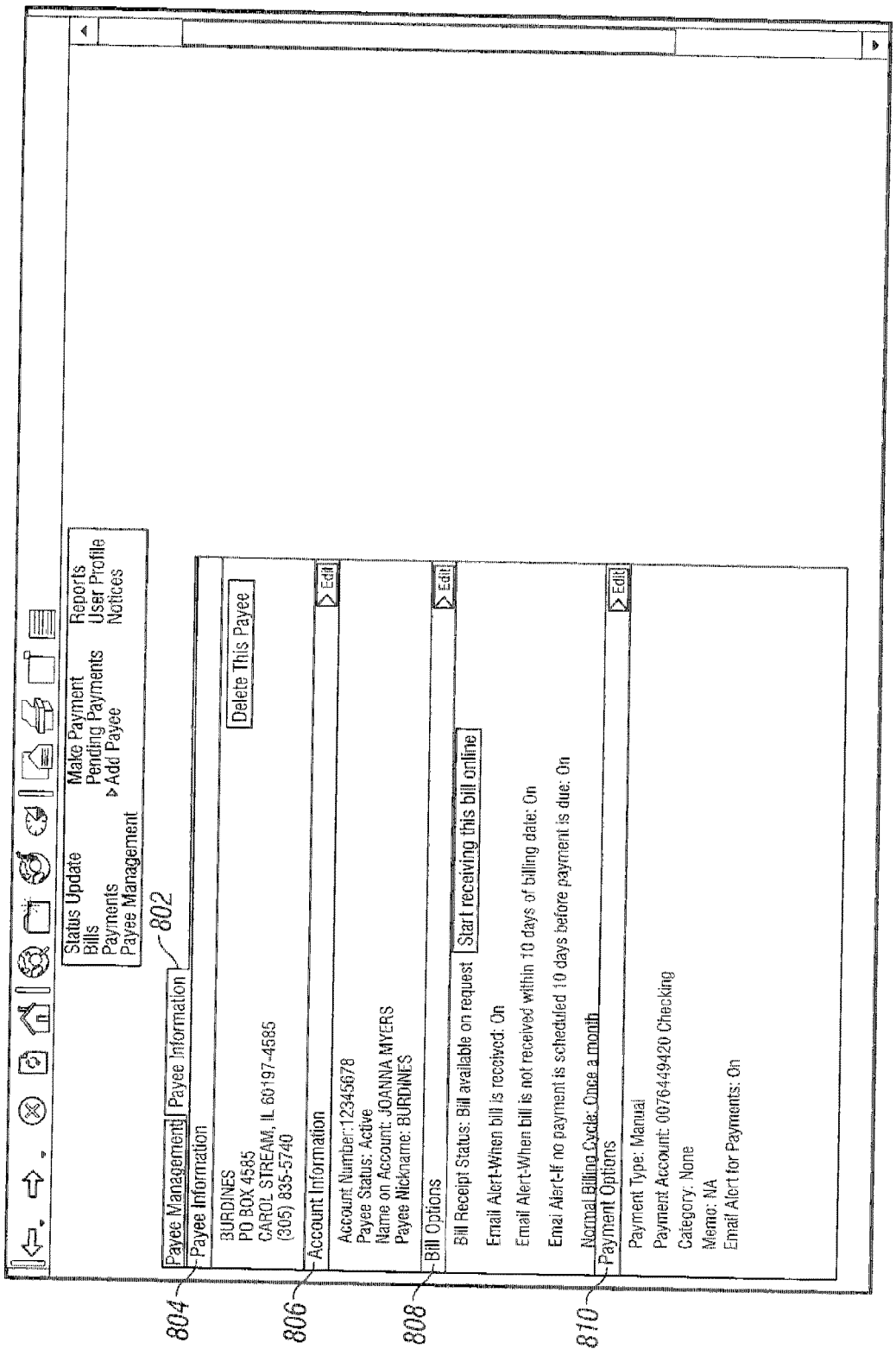
FIG. 8 is a screen print of an Edit Payee screen according to the invention.
Figure 9:
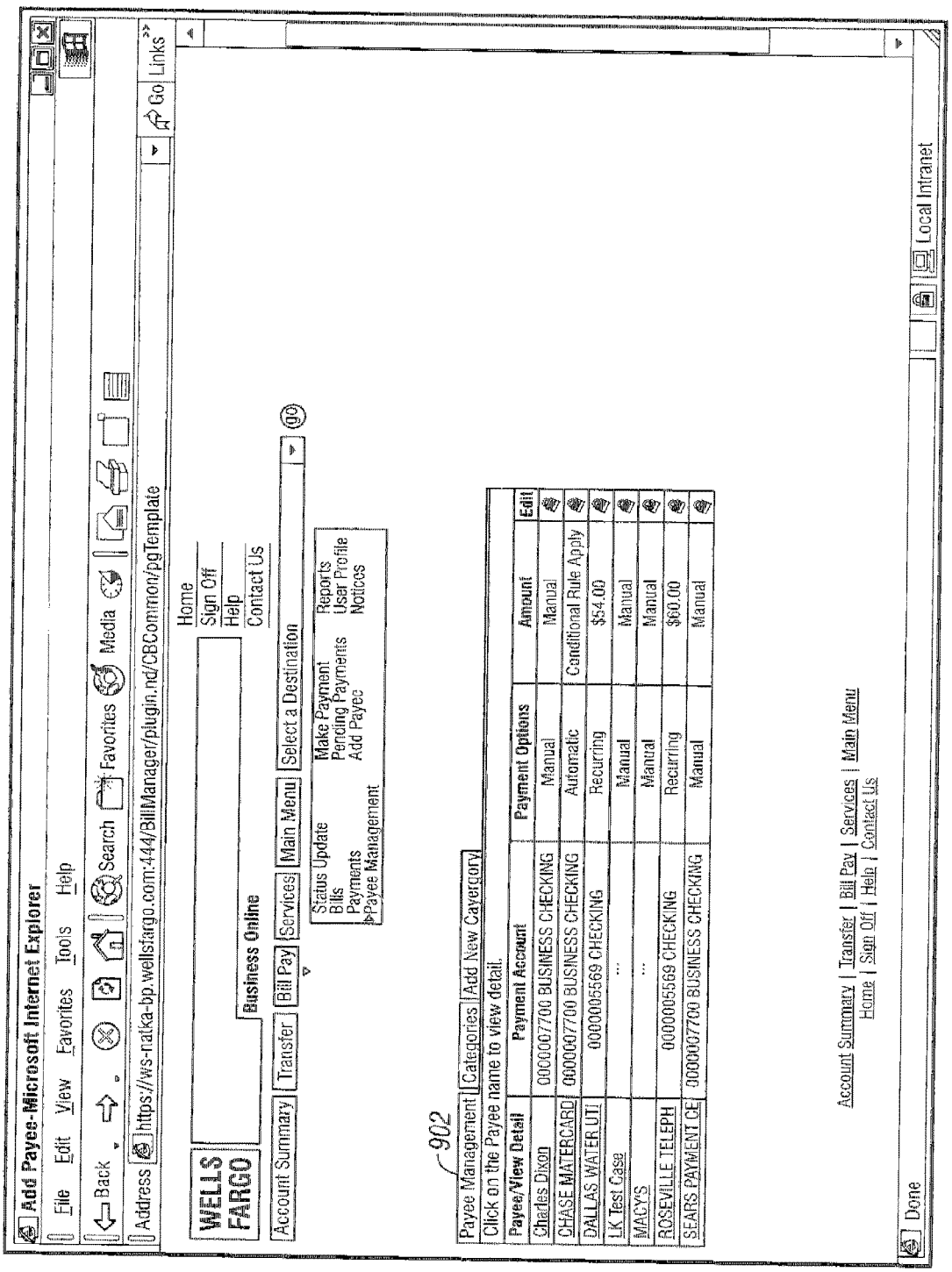
FIG. 9 is a screen print of a Payee Management screen according to the invention.
Figure 10:
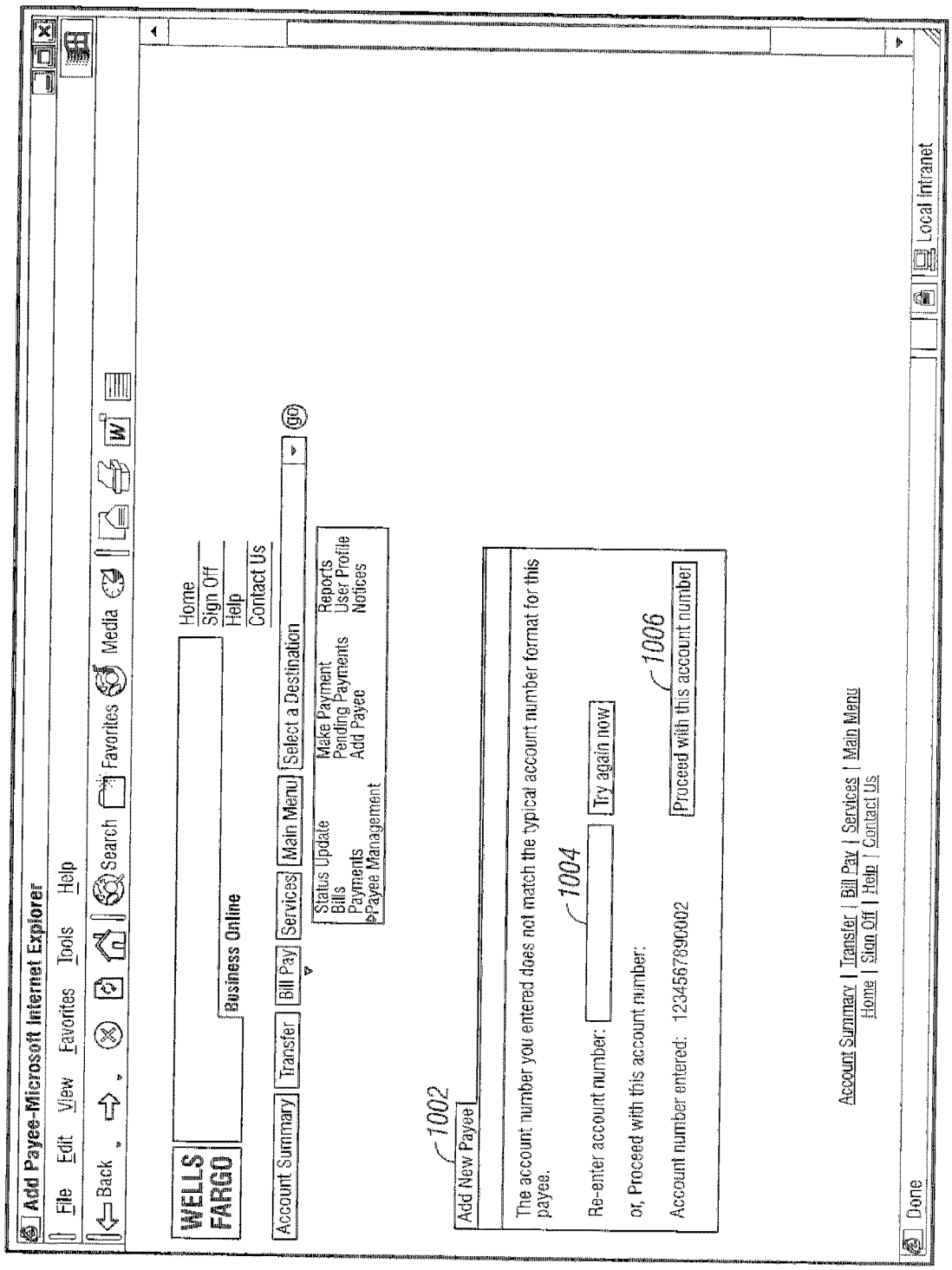
FIG. 10 is a screen print of an Account Number Not Valid screen according to the invention.
Figure 11:
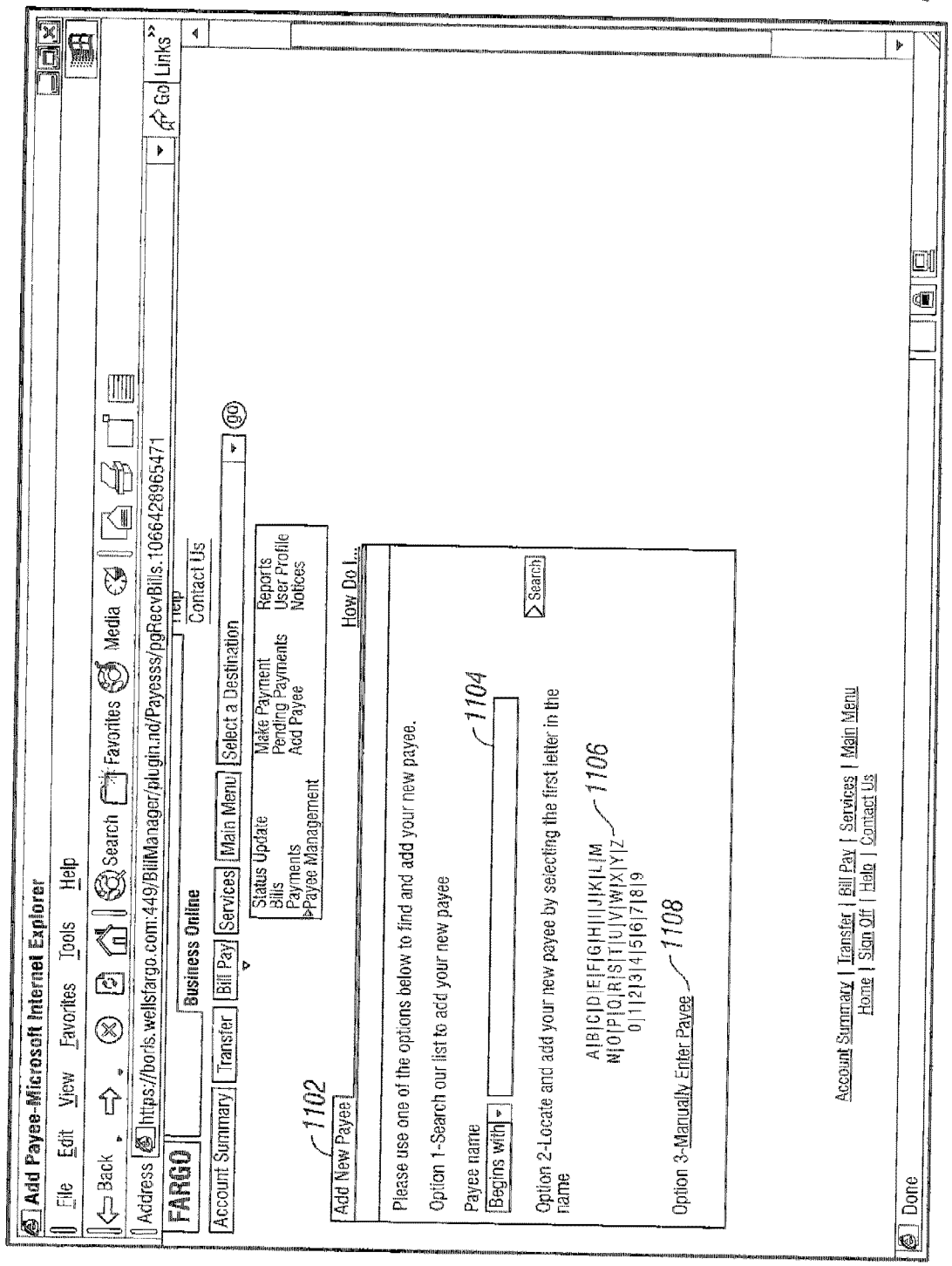
FIG. 11 is a screen print of a Search & Browse Payee screen according to the invention.

| Figure # | Screen Number or Diagram Letter |
|---|---|
| | Mapping |
| FIG. 2a | Diagram A |
| FIG. 2b | Diagram B |
| FIG. 3 | Diagram D |
| FIG. 4 | Screen 3a-1 |
| FIG. 5 | Screen 3a-2 |
| FIG. 6 | Screen 5b-1 |
| FIG. 7 | Screen 7 |
| FIG. 8 | Screen 8.5 |
| FIG. 9 | Screen 18 |
| FIG. 10 | Screen 6 |
| FIG. 11 | Screen 0 |

Overview of the Exemplary eBAM

Bill Pay is experiencing a high rate of eBill account mask failures when Customers attempt to activate eBills. Preliminary research indicates that the issues are primarily the result of how Customers are entering their account numbers when adding payees. Apparently, Customers are not following the instructions that appear on Add Payee screens when adding account information, specifically the account number, leading to the high level of eBill activation rejections.

One embodiment of the invention develops a series of account number handling rules that can be dynamically applied at the Merchant level based on the Merchant supplied account masks. This series of account number handling rules act as a scrubbing mechanism, cleansing the account number a Customer enters to improve the match rate on eBill account masks leading to a decrease in the level of eBill account mask failures.

In addition to the account number handling rules, the invention also includes:
  a global trim rule to handle leading and trailing spaces for all customer entered account numbers;
  a second pass of the Account Mask routines if the system cleansed account numbers do not pass both the Payee account mask and eBill account mask when adding eBillers;
  a screen navigation change to allow for Customer re-try of an account number that fails a Merchant eBill account mask;
  a screen content change to assist users when re-entering account numbers after an eBill account mask failure; and
  a report to assist the Bill Pay administrators in the creation and maintenance of the account cleansing rules.

Assumptions

Following is a list of assumptions for building and using the exemplary eBAM system and method:
  Account number handling rules are defined at the merchant level and applied globally to all of the merchant's eBillers;
  A global trim rule, including trim leading and trailing spaces, is applied to all personal payee activations; this rule is for all payees, i.e. private and pick list;
  Pre-existing accounts do not require updating when the account number handling rules go into production because the new rules are applied as customers activate eBills;
  Customer account number update functionality within enterprise's existing bill payment system is not impacted;

Detailed Process Specifications

This rest of the discussion covers detailed description of the following features in a separate section:
  The Global Trim Rule;
  Account Number Handling and Payee Creation Process;
    Extracting and Formatting of Account Numbers;
    Passing the Account Masks;
    Second Pass Functionality;
    Account Number Storage;
  Screen Navigation Change;
  Screen Content Change—Account Number Not Valid Screen (Screen 6); and
  Reporting.

The Global Trim Rule

In one embodiment of the invention, the Global Trim Rule is as follows:
  Always trim leading and trailing spaces from the account number entered by the Customer/agent/system; and
  Rule applies to ALL Customer Payees.

Global Trim Rule Examples

Below are three examples of the Global Trim Rule detailing how the rule extracts spaces from Customer entered account numbers. In these examples an underscore ("_") denotes a space.

EXAMPLE 1

Trimming Leading Spaces, as Shown in Table C Hereinbelow

TABLE C

| Customer Entered Account Number | "_ _ _ 4245 0918 0012 6742" |
|---|---|
| Trimmed Account Number | "4245 0918 0012 6742" |

EXAMPLE 2

Trimming Trailing Spaces, as Shown in Table D Hereinbelow

TABLE D

| Customer Entered Account Number | "4245 0918 0012 6742_ _ _" |
|---|---|
| Trimmed Account Number | "4245 0918 0012 6742" |

EXAMPLE 3

Trimming Leading and Trailing Spaces as Shown in Table E Hereinbelow

TABLE E

| Customer Entered Account Number | "_ _ _ 4245 0918 0012 6742_ _ _" |
|---|---|
| Trimmed Account Number | "4245 0918 0012 6742" |

An Exemplary Account Number Handling and Payee Creation Process

An exemplary implementation of the account handling rules and payee creation according to one embodiment of the invention is provided hereinbelow. This implementation is described by way of example and is not meant to be limiting. One skilled in the art can readily apply the system and method to other embodiments and to other industries that rely on account numbers and be within the scope of the invention.

In one embodiment of the invention, the account number handling process includes four steps as shown:
- extracting: The account number is extracted from the Trimmed Account Number based on any defined Merchant extract rules;
- formatting: The account number is formatted in order to pass the Payee account mask and eBill account mask;
- passing the account masks: The account number is passed through the Payee account mask and eBill account mask routines; and
- account number storage: Based on the results of the passing the account masks, the system required account numbers are stored.

Extracting and Formatting of Account Numbers

For the purposes of this documentation the extracting and formatting of account numbers is viewed as part of the same process, with the newly defined account number handling rules encompassing both extracting and formatting rules. The defined account number handling rules according to one embodiment of the invention are as follows:
- based on the range of Merchant eBill account mask and Payee account mask specifications;
- defined at the Merchant level and applied globally across the Merchant eBillers for that Merchant;
- applied prior to the Payee account mask and eBill account mask routines when a Customer is requesting the activation of an eBill;
- applied to any Customer entered account number entry when requesting activation of an eBill via the current pick-list functionality;
- applied to any pre-filled account number or Customer updated account number entry when a Customer is activating eBills for an existing Payee;
- processed with the use of regular expressions as discussed in detailed further hereinbelow; and
- dynamic in that a Bill Pay administrator and the like have the ability to update the account number handling rules on an as needed basis.

The following list shows generic examples of account number handling rules according to one embodiment of the invention:
- Extract numeric digits;
- Use only the first n digits;
- Replace character "a" with character "b", e.g. replace hyphens with spaces;
- Remove special characters; and
- Make alpha characters upper case.

Account Number Handling Rules and Regular Expressions

In one embodiment of the invention regular expressions are employed as part of the account number handling process. A regular expression is a formula for matching strings that follow some pattern. In this use, regular expressions are used to extract and format characters enabling Customer entered account numbers, or system populated Customer account numbers, to pass the merchant defined account masks.

The following Table F contains some simple regular expression characters:

TABLE F

| Character | Description |
|---|---|
| . | Match Any Single Character |
| [ ] | Match any character found within the brackets. Can also be used to match a set of characters, or groups of sets. i.e.: [0-9], [a-z, A-Z], or [0123]. |
| [^] | Match any character not found within the brackets Works just like above, only matches anything not listed. i.e.: [^0-9] matches everything but [0-9]. |
| ^ | Designates the start of line. |
| $ | Designates the end of line. |
| * | Match 0 ore more occurrences of preceding regular expression. |

Three examples of Regular Expressions are as follows:

EXAMPLE 1

[0-9]{3}\-[0-9]{2}\-[0-9]{4} Matches all numbers of the form 123-12-1234

EXAMPLE 2

[0-9]{3}\-?[0-9]{2}\-?[0-9]{4} Matches all numbers of the form 123-12-1234 or 123121234

EXAMPLE 3

[0-9]{12} [A-Z]{2} Matches all numbers with the first 12 characters being numeric and the last two alpha, e.g. 123443218976DE First Pass Functionality When a customer is activating an eBill, at least one of each type of account masks is passed successfully. Masks are presented for passing as follows:
- Payee account mask: describes the attributes of the customer account number to qualify for a particular Merchant Payee; and
- eBill account mask: describes the attributes of the customer account number to qualify for a particular Merchant eBiller.

For example, a merchant may require a set format divided by hyphens and/or spaces or other type of account number requirements, with these requirements being based in the merchant's account masks. The passing or failing of these two account masks determines the following:
- account number storage, described in detail hereinbelow;
- the success or failure of eBill activation, described in detail hereinbelow; and
- the Customer's screen navigation flow, described in detail hereinbelow.

The first pass uses the cleansed account number.

Second Pass Functionality

In addition to the new account number handling rules a new Second Pass of the Account Mask routines is implemented in one embodiment of the invention. The second pass occurs when the system cleansed account numbers do not pass both the Payee account mask and eBill account mask when adding eBillers. New embodiment of functionality is as follows:
- Customer enters account number when activating an eBill;
- Customer's entered account number is cleansed based on the defined account handling rules, with the formatted, i.e. cleansed, account number run through the Payee account mask and eBill account mask;

If the first pass of the account masks has any failures, i.e. Payee account mask and/or eBill account mask fails, then a second pass occurs; and The second pass entails running the Trimmed Account Number, i.e. Customer entered account number after the Global Trim Rule has been applied, through the Payee account mask and eBill account mask.

The Second Pass of the Account Masks also:

occurs if and only if the Payee account mask and/or eBill account mask fail on the first pass when adding an eBiller;

includes the use of the Trimmed Account Number only because formatted account numbers are run on the first pass; and is applied prior to presenting the Account Number Not Valid Screen, e.g. Screen 6.

In one embodiment of the invention, prior to the generation of Screen 6, a Second Pass of the Payee Account Mask and the eBill Account Mask with the trimmed Account Number is performed in an attempt to pass the two account edit masks. Prior to the initial generation of Screen 6, the trimmed account number is run against the first order BPP, with all BPPs in the hierarchy being employed during any further generation of Screen 6.

The screen flows of one embodiment of the invention are depicted in FIGS. 1, 2*a*, 2*b*, and 3. One can refer to Table B for the map of screen number reference to Figure number reference.

FIG. 1 shows first pass and second pass functionality according to the invention 100. A first mask pass is performed 102 with a formatted account number. Depending on the results, e.g. eBill=Pass and Payee=Pass, the flow is determined. If eBill=Pass and Payee=Pass 108, then control bypasses the second mask pass and Screen 6 and goes directly to a different screen, depicted as Screen 5*b*-1 110, a payments options screen for online bill payment. If any of the outcomes are fail 102*a*-*c*, then the second mask pass with trimmed account number is performed 104 and 104*a*-*c*. If eBill=Pass and Payee=Pass, then control goes directly to Screen 5*b*-1 110. If any of the outcomes contain a fail, then, control goes to Screen 6 106 and 106*a*-*c*. After performing the tasks on Screen 6 106*a*-*c*, control continues as follows. If the merchant is either restricted or unrestricted, control continues with FIG. 2*a*. The re-entered account number 202 goes through the account number handling rules 204 process. If the account number passed the payee mask 206, then it is checked against the eBill mask 208. If it passes the eBill mask, then eBill is activated 210. If the account number does not pass the payee mask, then the customer is shown Screen 6 212. If the customer does try again 222, for a restricted merchant, control goes to FIG. 2*b* and for an unrestricted merchant, control goes to FIG. 3. If the customer does not proceed, the customer is shown Screen 7 214 and can either chose to add the payee as a personal payee 216 or is shown Screen 0 218, where the customer can add a new payee. If the account number did not pass the eBill mask 208, then Screen 6 is shown to the customer 220. If the customer does try again 224, for a restricted merchant, control goes to FIG. 2*b* and for an unrestricted merchant, control goes to FIG. 3. If the customer does not proceed, the customer is shown Screen 7 226 and can either chose to add the payee from a pick list 228 or is shown Screen 0 230, where the customer can add a new payee.

With reference to FIG. 2*b* (Diagram B), essentially the same first pass and second pass steps are performed. The exception is that control is sent to the bill payment processor (BPP) when the account number passes the payee mask 252 and 254. Again, if the merchant makes eBills available, then the customer can add a payee from a pick list 256, 258, and 260. Otherwise, the customer adds the payee as a personal payee and the enterprise remittance system sends a check out to the payee 262.

FIG. 3 shows the same steps as FIG. 2*b*, except that when the account number does not have to pass through the bill payment processor 302 but passes the eBill mask 304, then the eBill process for that merchant is activated 306, which was not possible for a restricted merchant.

FIG. 4 shows an Add New Payee screen that is prompting the user to enter the account number with specific instructions 400. FIG. 5 shows an Add New Payee screen that is prompting the user to enter the account number with specific instructions 500 and that shows a business name as it appears on the bill 502. FIG. 6 shows an edit payee screen 602 where the customer can choose a payment option 604. FIG. 7 shows a non-eligible to receive bills electronically screen 700. FIG. 8 shows a payee information screen 802. It further shows detailed payee information 804, customer account information 806, bill presentment options for the customer 808, and payment options from the customer 810. FIG. 9 shows a payee management screen 902 of the numerous payees for a particular customer. FIG. 10 shows an add new payee screen 1002 for when the account number entered previously did not match the typical account number format for this payee. The customer is prompted to re-enter the account number in the space provided 1004. Also, the screen offers an account number reflecting what the customer previously added and allows the customer to select that number instead 1006. FIG. 11 shows an add new payee screen 1102 where the customer is given the choice two options for selecting a payee from a pick list 1104 and 1106, or for manually entering a payee 1108, which, in one embodiment of the invention, means that the payee is sent a check.

Account Number Storage

In one embodiment of the invention, after the Payee account mask and eBill account mask routines are run, three system account numbers are stored as follows:

Customer Viewable Account Number: the account number displayed to the Customer via the user interface;

Remit Account Number: the account number employed in the Bill Pay payment process; and eBiller Account Number: account number employed for eBill activation and deactivation along with the handling of ebills.

The account number format stored for each of the three types is determined by the pass/fail results of the Payee account mask and eBill account mask routines.

The technical solution may include a design in which a separate regular expression is stored for each of the three account numbers. In this embodiment, the business requirement is to have a single identical regular expression for each of the three account numbers, i.e. Customer Viewable, Remit and eBiller.

In one embodiment of the invention, there are two formats in which the three system account numbers can be stored:

Trimmed: The identical account number that the Customer entered with only the Global Trim Rule being applied; and Formatted (Cleansed): The Trimmed account number that has been further handled based on the defined account number handling rules for that Merchant.

Regular Expressions and the Three Stored Account Numbers

Following are example implementations for storing regular expressions for each of the account numbers according to one embodiment of the invention. The technical solution for account number storage in one embodiment of the invention includes a design in which a separate regular expression is stored for each of the three account numbers, however the current business requirement is to have a single identical regular expression for each of the three account numbers, i.e. Customer Viewable, Remit, and eBiller. Following is a more detailed look at available functionality and the business requirement for this embodiment of the invention.

Available Functionality

Available functionality based on the technical design allows for each of the three stored account numbers to have individual, i.e. different, extract regular expressions and format regular expressions as shown in the following Table G.

TABLE G

| Account Number | Trimmed Account Number | Extract Regular Expression | Format Regular Expression | Stored Account # |
|---|---|---|---|---|
| Customer Viewable | 1234567890 | ^[0-9]*([0-9]{3})[0-9]*([0-9]{4})[0-9]*([0-9]{2})[0-9]*([0-9]{1}).*$ | $1-$2-$3-$4 | 123-4567-89-0 |
| Remit | 1234567890 | ^[0-9]*([0-9]{3})[0-9]*([0-9]{4})[0-9]*([0-9]{1})[0-9]*([0-9]{2}).*$ | $1$2$3$4 | 1234567890 |
| eBiller | 1234567890 | ^[0-9]*([0-9]{3})[0-9]*([0-9]{3})[0-9]*([0-9]{2})[0-9]*([0-9]{2}).*$ | $1-$2-$3-$4 | 123-456-78-90 |

Business Requirement

The business requirement for this implementation of one embodiment of the invention is to have identical extract regular expressions and format regular expressions for each of the three stored account numbers, i.e. Customer Viewable, Remit, and eBiller. Employing the same extract and format regular expressions for each of the stored account numbers means that the three account numbers are the same.

All three stored account numbers employ the same extract regular expression, i.e. Extract Regular Expression #1, and the same format regular expression, i.e. Format Regular Expression #1, which leads to the end result of the same account number stored for the Customer Viewable, Remit, and eBiller account numbers. See the example in Table H below.

TABLE H

| Account Number | Trimmed Account Number | Extract Regular Expression | Format Regular Expression | Stored Account # |
|---|---|---|---|---|
| Customer Viewable | 1234567890 | ^[0-9]*([0-9]{3})[0-9]*([0-9]{4})[0-9]*([0-9]{2})[0-9]*([0-9]{1}).*$ | $1-$2-$3-$4 | 123-4567-89-0 |
| Remit | 1234567890 | ^[0-9]*([0-9]{3})[0-9]*([0-9]{4})[0-9]*([0-9]{2})[0-9]*([0-9]{1}).*$ | $1-$2-$3-$4 | 123-4567-89-0 |
| eBiller | 1234567890 | ^[0-9]*([0-9]{3})[0-9]*([0-9]{4})[0-9]*([0-9]{2})[0-9]*([0-9]{1}).*$ | $1-$2-$3-$4 | 123-4567-89-0 |

Add Payee Scenarios

The following Table I presents five Add Payee scenarios, providing detail regarding the passing of account masks and account number storage according to one embodiment of the invention.

TABLE I

| Scenario | Payee Account Mask Result | eBill Account Mask Result | Customer Viewable Account Number (display) | Remit Account Number | eBiller Account Number |
|---|---|---|---|---|---|
| New Payee and customer selects NO to eBills. | Pass or Fail | N/A | Trimmed | Trimmed | N/A |
| New Payee and customer selects YES to eBills. | Pass | Pass | Formatted | Formatted | Formatted |
| New Payee and customer selects YES to eBills. | Pass or Fail | Fail | Trimmed | Trimmed | N/A |
| Activate eBills on existing Payee | Pass | Pass | Formatted | Formatted | Formatted |
| Activate eBills on existing Payee | Pass or Fail | Fail | Trimmed | Trimmed | N/A |

For each Add Payee account scenario the following is provided:

Definition;

Account Mask Rules;

Scenario Steps and Account Number Handling Example; and

Account Number Storage Requirements.

Scenario 1

The Scenario 1 Definition: Adding new Payee and customer selects NO to eBills.

The Scenario 1 Account Mask Results are as follows in Table J:

TABLE J

| Payee Account Mask Result | eBill Account Mask Result |
| --- | --- |
| Pass or Fail | N/A |

The Scenario 1 Steps and Account Number Handling Example is as follows in Table K:

TABLE K

| Step | Screen Number | Account Number Handling Action | Account Number Example |
| --- | --- | --- | --- |
| Customer selects Payee, i.e. This is my Payee link | 1a | N/A | N/A |
| Customer selects NO to eBills | 2 | N/A | N/A |
| Customer enters their account number | 3c1 (Consumer) 3c2 (Business) | N/A | 7028312345310_ _ _ |
| Global Trim Rule for leading and trailing spaces is applied, i.e. Customer Entered Account Number becomes Trimmed Account Number | N/A | leading and/or trailing spaces are removed from the Customer Entered Account Number | 7028312345310 |
| No further account number handling rules are applied, because the Customer selects NO to eBills | N/A | N/A | N/A |
| Trimmed Account Number is used in the Payee Mask routine with the account number passing the mask routine | N/A | N/A | 7028312345310 |
| Trimmed account number is stored for the Customer Viewable Account Number | N/A | N/A | 7028312345310 |
| Trimmed account number is stored for the Remit Account Number | N/A | N/A | 7028312345310 |

The Scenario 1 Account Number Storage Requirements are as follows in Table L:

TABLE L

| Payee Account Mask Result | eBill Account Mask Result | Customer Viewable Account Number (display) | Remit Account Number | eBiller Account Number |
| --- | --- | --- | --- | --- |
| Pass or Fail | N/A | Trimmed | Trimmed | N/A |

Scenario 2

The Scenario 2 Definition: Adding a new Payee and Customer selects YES to eBills, passing both Payee account mask and eBill account mask.

The Scenario 2 Account Mask Results are as follows in Table M:

TABLE M

| Payee Account Mask Result | eBill Account Mask Result |
| --- | --- |
| Pass | Pass |

The Scenario 2 Steps and Account Number Handling Example are as follows in Table N:

TABLE N

| Step | Screen Number | Account Number Handling Action | Account Number |
|---|---|---|---|
| Customer selects Payee, i.e. This is my Payee link | 1a | N/A | N/A |
| Customer selects YES to eBills | 2 | N/A | N/A |
| Customer enters Customer account number | 3a-1 (Consumer) 3a-2 (Business) | N/A | 6018999953319999_ |
| Global Trim Rule for leading and trailing spaces is applied | N/A | Leading and/or trailing spaces are removed from the Customer Entered Account Number | 6018999953319999 |
| The Upper Case Rule, if applicable, and the defined account number handling regular expression is performed on the account number in order to assist in passing the Payee account mask and eBill account mask | N/A | Uppercase Rule Extract Regular Expression ^[0-9]*([0-9]{4})[0-9]*([0-9]{4})[0-9]*([0-9]{4})[0-9]*([0-9]{4}).*$ Format: $1 $2 $3 $4 | 6018 9999 5331 9999 |
| Both the Payee account mask and eBill account mask are passed | N/A | N/A | N/A |
| Formatted account number based on defined account number handling rules is stored for the Customer Viewable Account Number | N/A | Upper Case Rule Extract Regular Expression ^[0-9]*([0-9]{4})[0-9]*([0-9]{4})[0-9]*([0-9]{4})[0-9]*([0-9]{4}).*$ Format: $1 $2 $3 $4 | 6018 9999 5331 9999 |
| Formatted account number based on defined account number handling rules is stored for the Remit Account Number | N/A | Upper Case Rule Extract Regular Expression ^[0-9]*([0-9]{4})[0-9]*([0-9]{4})[0-9]*([0-9]{4})[0-9]*([0-9]{4}).*$ Format: $1 $2 $3 $4 | 6018 9999 5331 9999 |
| Formatted account number based on defined account number handling rules is stored for the eBiller Account Number | N/A | Upper Case Rule Extract Regular Expression ^[0-9]*([0-9]{4})[0-9]*([0-9]{4})[0-9]*([0-9]{4})[0-9]*([0-9]{4}).*$ Format: $1 $2 $3 $4 | 6018 9999 5331 9999 |

The Scenario 2 Account Number Storage Requirements are as follows in Table O:

TABLE O

| Payee Account Mask Result | eBill Account Mask Result | Customer Viewable Account Number (display) | Remit Account Number | eBiller Account Number |
|---|---|---|---|---|
| Pass | Pass | Formatted | Formatted | Formatted |

Scenario 3

The Scenario 3 Definition: Adding a new Payee and Customer selects YES to eBills, passing and/or failing the Payee account mask and failing the eBill account mask.

The Scenario 3 Account Mask Results are as follows in Table P:

TABLE P

| Payee Account Mask Result | eBill Account Mask Result |
|---|---|
| Pass or Fail | Fail |

The Scenario 3 Steps and Account Number Handling Example are as follows in Table Q:

TABLE Q

| Step | Screen Number | Account Number Handling Action | Account Number |
|---|---|---|---|
| Customer selects Payee, i.e. This is my Payee link) | 1a | N/A | N/A |
| Customer selects YES to eBills | 2 | N/A | N/A |
| Customer enters their account number | 3a-1 (Consumer) 3a-2 (Business) | N/A | 7028312345310 |

TABLE Q-continued

| Step | Screen Number | Account Number Handling Action | Account Number |
|---|---|---|---|
| Global Trim Rule for leading and trailing spaces is applied. | N/A | Leading and/or trailing spaces are removed from the Customer Entered Account Number | 7028312345310 |
| Payee account mask either passes or fails and the eBill account mask fails | N/A | N/A | N/A |
| No further account number handling rules are applied, because the eBill account mask failed. A second pass of the Payee account mask and eBill account routines with the Trimmed Account Number now takes place. See Section on the Second Account Mask Pass functionality herein for further information. For this scenario the second pass of the account mask routines results in the same outcome, i.e. the Payee account mask either passes or fails and the eBill account mask fails. | N/A | N/A | N/A |
| No further account number handling rules are applied, because the eBill account mask failed. On eBill Account Mask failure the Customer is directed to Screen 6 and provided the opportunity to re-try their account number. | 6 | N/A | 7028312345310 |
| The Trimmed account number is stored as the Customer Viewable Account Number. | N/A | N/A | 7028312345310 |
| The Trimmed account number is stored as the Remit Account Number. | N/A | N/A | 7028312345310 |
| eBiller Account Number storage is N/A | N/A | N/A | N/A |

The Scenario 3 Account Number Storage Requirements are as follows in Table R:

TABLE R

| Payee Account Mask Result | eBill Account Mask Result | Customer Viewable Account Number (display) | Remit Account Number | eBiller Account Number |
|---|---|---|---|---|
| Pass or Fail | Fail | Trimmed | Trimmed | N/A |

Scenario 4

The Scenario 4 Definition: Activate eBills on existing Payee, with the Customer Account Number, either pre-filled or entered by the Customer, passes both Payee account mask and eBill account mask.

The Scenario 4 Account Mask Results are as follows in Table S:

TABLE S

| Payee Account Mask Result | eBill Account Mask Result |
|---|---|
| Pass | Pass |

The Scenario 4 Steps and Account Number Handling Example are as follows in Table T:

TABLE T

| Step | Screen Number | Account Number Handling Action | Account Number |
|---|---|---|---|
| From any Bill Pay screen click on Payee Management in the Bill Pay Menu | N/A | N/A | N/A |
| On the Payee Management screen, i.e. screen #18, click on the Edit icon next to the desired payee to get to the Payee Information screen, screen #8.5 | 18 | N/A | N/A |
| In the Bill Options section of the Payee Information screen, click on the button "Start receiving this bill online" to get to screen 3a-1/3a-2. | 8.5 | N/A | N/A |
| Customer enters their account number | 3a-1 (Consumer) 3a-2 (Business) | N/A | 6018999953319999 |
| Global Trim Rule for leading and trailing spaces is applied. | N/A | Leading and/or trailing spaces are removed from the Customer Entered Account Number | 6018999953319999 |
| The Upper Case Rule, if applicable, and the defined account number handling regular expression is performed on the account number to assist in passing the Payee account mask and eBill account mask | N/A | Upper Case Rule Extract Regular Expression ^[^0-9]*([0-9]{4})[^0-9]*([0-9]{4})[^0-9]*([0-9]{4})[^0-9]*([0-9]{4}).*$ Format: $1 $2 $3 $4 | 6018 9999 5331 9999 |
| Both the Payee account mask and eBill account mask passed | N/A | N/A | N/A |
| Formatted account number based on defined account number handling rules is stored for the Customer Viewable Account Number | N/A | Upper Case Rule Extract Regular Expression ^[^0-9]*([0-9]{4})[^0-9]*([0-9]{4})[^0-9]*([0-9]{4})[^0-9]*([0-9]{4}).*$ Format: $1 $2 $3 $4 | 6018 9999 5331 9999 |
| Formatted account number based on defined account number handling rules is stored for the Remit Account Number | N/A | Upper Case Rule Extract Regular Expression ^[^0-9]*([0-9]{4})[^0-9]*([0-9]{4})[^0-9]*([0-9]{4})[^0-9]*([0-9]{4}).*$ Format: $1 $2 $3 $4 | 6018 9999 5331 9999 |
| Formatted account number based on defined account number handling rules is stored for the eBiller Account Number | N/A | Upper Case Rule Extract Regular Expression ^[^0-9]*([0-9]{4})[^0-9]*([0-9]{4})[^0-9]*([0-9]{4})[^0-9]*([0-9]{4}).*$ Format: $1 $2 $3 $4 | 6018 9999 5331 9999 |

The Scenario 4 Account Number Storage Requirements are as follows in Table U:

TABLE U

| Payee Account Mask Result | eBill Account Mask Result | Customer Viewable Account Number (display) | Remit Account Number | eBiller Account Number |
|---|---|---|---|---|
| Pass | Pass | Formatted | Formatted | Formatted |

Scenario 5

The Scenario 5 Definition: Activate eBills on existing Payee, with the Customer Account Number, either pre-filled or entered by the Customer, passes or fails Payee account mask, and fails eBill account mask.

The Scenario 5 Account Mask Results are as follows in Table V:

TABLE V

| Payee Account Mask Result | eBill Account Mask Result |
|---|---|
| Pass or Fail | Fail |

The Scenario 5 Steps and Account Number Handling Example are as follows in Table W:

TABLE W

| Step | Screen Number | Account Number Handling Action | Account Number |
|---|---|---|---|
| From any Bill Pay screen click on Payee Management in the Bill Pay Menu | N/A | N/A | N/A |
| On the Payee Management screen, Screen 18, click on the Edit icon next to the desired payee to get to the Payee Information screen, Screen 8.5 | 18 | N/A | N/A |
| In the Bill Options section of the Payee Information screen, click on the button "Start receiving this bill online" to get to screen 3a-1/3a-2 | 8.5 | N/A | N/A |
| Customer enters their account number | 3a-1 (Consumer) 3a-2 (Business) | N/A | 7028312345310 |
| Global Trim Rule for leading and trailing spaces is applied | N/A | Leading and/or trailing spaces are removed from the Customer Entered Account Number | 7028312345310 |
| Payee account mask either passes or fails and the eBill account mask fails | N/A | N/A | 7028312345310 |
| No further account number handling rules are applied, because the eBill account mask failed. A second pass of the Payee account mask and eBill account routines with the Trimmed Account Number now takes place. See section on the New Second Account Mask Pass functionality for further information. For this scenario, the second pass of the account mask routines results in the same outcome a pass | N/A | N/A | N/A |
| No further account number handling rules are applied, because the eBill account mask failed. On eBill Account Mask failure, the Customer is directed to Screen 6 and provided the opportunity to re-try their account number. | 6 | N/A | N/A |
| The Trimmed account number is stored as the Customer Viewable Account Number. | N/A | N/A | 7028312345310 |
| The Trimmed account number is stored as the Remit Account Number. | N/A | N/A | 7028312345310 |
| eBiller Account Number storage is N/A | N/A | N/A | N/A |

The Scenario 5 Account Number Storage Requirements are as follows in Table X:

TABLE X

| Payee Account Mask Result | eBill Account Mask Result | Customer Viewable Account Number (display) | Remit Account Number | eBiller Account Number |
|---|---|---|---|---|
| Pass or Fail | Fail | Trimmed | Trimmed | N/A |

Merchant that Provides eBills

A Merchant that provides eBills may receive account number handling rules. For a Sample Merchant, the following is presented:

Sample Merchant Information;
Account Number Handling Rules; and
Account Number Handling Examples.

Sample Merchant

Sample Merchant information is presented in Table Y as follows:

TABLE Y

| Merchant Name | Merchant ID | Payee Account Mask | eBill Account Mask | Biller Help (BLR_HELP) | Biller Restricted (BLR_RESTRICT) |
|---|---|---|---|---|---|
| Sample Merchant | 1234 | ^67899\d{11}$ | \d{4} \d{4} \d{4} \d{4}$ | Please enter your account number exactly as shown on your paper statement or credit card. For example; 9999 9999 9999 9999 (include spaces but not dashes). | For authentication of your request, your social security number is required (no dashes). Upon activation, you will receive your first electronic statement in the next billing cycle, and you will continue to receive paper statements until further notice. |

This Sample Merchant Information shows a single Payee Account Mask when in reality there may be more than a single Payee Account Mask.

The following Table Z shows account number handling rules for the Sample Merchant.

TABLE Z

| Upper Case | Extract | Format |
|---|---|---|
| N/A | ^[0-9]*([0-9]{4})[^0-9]*([0-9]{4})[^0-9]*([0-9]{4})[^0-9]*([0-9]{4}).*$ | $1 $2 $3 $4 |

Following are five (5) account number handling examples for Sample Merchant.

Table AA below illustrates Example 1:

TABLE AA

| Account Number Handling Action | Account Number Handling | Example 1 | Notes |
|---|---|---|---|
| Trimmed Account Number | N/A | 6789999953319999 | Global Trim Rule has been applied to the Customer entered account number |
| Upper Case | N/A | 6789999953319999 | Upper Case Rule not applied to this Merchant. |
| Extract | ^[0-9]*([0-9]{4})[^0-9]*([0-9]{4})[^0-9]*([0-9]{4})[^0-9]*([0-9]{4}).*$ | 6789999953319999 | Special characters and alphas are removed. Four sets of 4 numeric characters, between 0 and 9, are extracted |
| Format | $1 $2 $3 $4 | 6018 5999 5331 9999 | The account number is formatted into a XXXX XXXX XXXX XXXX pattern, i.e. 4 sets of 4 numbers with a space between the sets. Number employed in attempting the First Pass of the account masks. |

Table BB below illustrated Example 2:

TABLE BB

| Account Number Handling Action | Account Number Handling | Example 2 | Notes |
|---|---|---|---|
| Trimmed Account Number | N/A | BR6789-9634-5673-4562 | Global Trim Rule has been applied to the Customer entered account number |
| Upper Case | N/A | BR6789-9634-5673-4562 | Upper Case Rule not applied to this Merchant. |
| Extract | ^[0-9]*([0-9]{4})[0-9]*([0-9]{4})[0-9]*([0-9]{4})[0-9]*([0-9]{4}).*$ | 6789963456734562 | Special characters and alphas are removed. Four sets of 4 numeric characters, between 0 and 9, are extracted |
| Format | $1 $2 $3 $4 | 6789 9634 5673 4562 | The account number is formatted into a XXXX XXXX XXXX XXXX pattern, i.e. 4 sets of 4 numbers with a space between the sets. Number employed in attempting the First Pass of the account masks. |

Table CC illustrates Example 3:

TABLE CC

| Account Number Handling Action | Account Number Handling | Example 3 | Notes |
|---|---|---|---|
| Trimmed Account Number | N/A | 6789-9438-2211-5451BR | Global Trim Rule has been applied to the Customer entered account number |
| Upper Case | N/A | 6789-9438-2211-5451BR | Upper Case Rule not applied to this Merchant. |
| Extract | ^[0-9]*([0-9]{4})[0-9]*([0-9]{4})[0-9]*([0-9]{4})[0-9]*([0-9]{4}).*$ | 6789943822115451 | Special characters and alphas are removed. Four sets of 4 numeric characters, between 0 and 9, are extracted |
| Format | $1 $2 $3 $4 | 6789 9438 2211 5451 | The account number is formatted into a XXXX XXXX XXXX XXXX pattern, i.e. 4 sets of 4 numbers with a space between the sets. Number employed in attempting the First Pass of the account masks. |

Table DD illustrates Example 4:

TABLE DD

| Account Number Handling Action | Account Number Handling | Example 4 | Notes |
|---|---|---|---|
| Trimmed Account Number | N/A | 6789-9438-2211-5 | Global Trim Rule has been applied to the Customer entered account number |

TABLE DD-continued

| Account Number Handling Action | Account Number Handling | Example 4 | Notes |
|---|---|---|---|
| Upper Case | N/A | 6789-9438-2211-5 | Upper Case Rule not applied to this Merchant. |
| Extract | ^[0-9]*([0-9]{4})[^0-9]*([0-9]{4})[^0-9]*([0-9]{4})[^0-9]*([0-9]{4}).*$ | 6789-9438-2211-5 | In this example the number would fail the Extract regular expression leaving the Trimmed Account Number as the number to be run against the Payee account mask and eBill account mask routines. |
| Format | $1 $2 $3 $4 | 6789-9438-2211-5 | Since the regular expression failed produce an acceptable result the Trimmed account number, 6789-9438-2211-5, will be the account number employed in attempting the First Pass of the account masks. |

Table EE illustrates Example 5:

TABLE EE

| Account Number Handling Action | Account Number Handling | Example 5 | Notes |
|---|---|---|---|
| Trimmed Account Number | N/A | 4871-5438-2211-5451 | Global Trim Rule has been applied to the Customer entered account number |
| Upper Case | N/A | 4871-5438-2211-5451 | Upper Case Rule not applied to this Merchant. |
| Extract | ^[0-9]*([0-9]{4})[^0-9]*([0-9]{4})[^0-9]*([0-9]{4})[^0-9]*([0-9]{4}).*$ | 4871543822115451 | Leading Special characters and alphas are removed.<br><br>Four sets of 4 numeric characters, between 0 and 9, are extracted |
| Format | $1 $2 $3 $4 | 4871 5438 2211 5451 | The account number is formatted into a XXXX XXXX XXXX XXXX pattern, i.e. 4 sets of 4 numbers with a space between the sets. Number employed in attempting the First Pass of the account masks. This example account number will fail the Payee account mask since the account number is to begin with "67899". |

Screen Navigation Change

In one embodiment of the invention, a screen navigation change is implemented to an existing Add Payee flow when adding eBills and when the account number fails the eBill account mask.

Screen Navigation Functionality

One embodiment of the invention provides a screen navigation when a customer passes a payee account mask and fails the eBill account mask. A re-try screen, i.e. an Account Number Not Valid screen—Screen #6, is presented to the customer. The following Table FF below details the new screen navigation flow based on payee account mask and eBill account mask pass/fails according to the invention:

TABLE FF

| Add Payee Scenario | Payee Account Mask Result | eBill Account Mask Result | Navigation |
|---|---|---|---|
| Adding a eBill opt-in | Pass | Pass | Proceed with Add Payee Options |
| Adding a eBill opt-in | Pass | Fail | Account Number Not Valid Screen- Screen #6 |
| Adding a eBill opt-in | Fail | Fail | Account Number Not Valid Screen- Screen #6 |
| Adding a eBill opt-in | Fail | Pass | Account Number Not Valid Screen- Screen #6 eBill account masks should always be a subset of payee account masks, so this scenario should never occur. |
| Adding a eBilr opt-out | Pass | N/A | Proceed with Add Payee Options |
| Adding a eBill opt-out | Fail | N/A | Account Number Not Valid Screen- Screen #6 |

Screen Content Change (Account # Not Valid Screen—Screen 6)

Following are display fields, input fields, and a navigation process according to one embodiment of the invention.

Display Fields

The display fields are shown hereinbelow in Table GG.

TABLE GG

| Field Name | Field Characteristics | Display Rules | Accessibility Attribute |
|---|---|---|---|
| The account number you entered does not match the typical account number format for this payee. | A/N | Always displays | |
| Re-enter account number: | Input field | Always displays | |
| or, Proceed with this account number: | A/N | Always displays | |
| Account number entered: | 22 A/N; Display Customer Viewable Account Number Note: On screen 6 the Customer | Always displays Display Customer | |

TABLE GG-continued

| Field Name | Field Characteristics | Display Rules | Accessibility Attribute |
|---|---|---|---|
| | Viewable Account Number should always be the Trimmed account number, i.e. Customer Entered Account Number with any leading and/or trailing spaces removed | Viewable Account Number | |
| Try again now | Button | Always displays | ALT text = Try again now |
| Proceed with this account number | Button | Always displays | ALT text = Proceed with this account number |

Input Fields

For messages, PU=pop-up message and AS=message appears above screen, as shown below in Table HH.

TABLE HH

| Field Name | Field Characteristics | Required? | Existing CB Error Message | Revised Error Message | New Error Message |
|---|---|---|---|---|---|
| Label = "Re-enter account number" | 22 A/N, Δ No pre-fill | | | If field is left blank, display the following message (AS): Input required for Re-enter account number. If an invalid character has been entered, display the following message (AS): An invalid character has been entered. Please manually re-enter information for the following field(s): Re-enter account number | |

Navigation

Navigation options and selections are shown hereinbelow in Table II.

TABLE II

| Selection . . . | Navigates to . . . |
|---|---|
| Δ How Do I . . . | New browser window opens and displays How Do I . . . main page. |
| "Try again now" button | Restricted Merchant If account number field is blank, display error message (AS): "Input required for Re-enter account number." If the customer's trimmed and formatted account results in at least one failed set of masks (either payee or eBill or both), then use the trimmed account against the payee and eBill account masks (second pass) to get the end result: If the account passes the payee account masks for the first order BPP, and passes the eBill account mask, display screen 4a. If the account fails all BPP payee masks and fails the eBill account mask, redisplay screen 7. If the account passes the payee account masks for the first order BPP, and fails the eBill account mask, display screen 7 |

TABLE II-continued

| Selection... | Navigates to... |
|---|---|
| | (payee will be added as a pick list payee if customer wishes to proceed adding payee on screen 7). |
| | If the account passes the payee account masks for the second or lower order BPP, and fails the eBill account mask, display screen 7 (payee will be added as a pick list payee if customer wishes to proceed adding payee on screen 7). |
| | If the account passes the payee account masks for the second or lower order BPP, and passes the eBill account mask, display screen 7 (payee will be added as a pick list payee if customer wishes to proceed adding payee on screen 7). |
| | The scenario where an account fails all BPP payee account masks and passes the eBill account mask should never occur. |
| | Unrestricted Merchant |
| | If account number field is blank, display error message (AS): "Input required for Re-enter account number." |
| | If the customer's trimmed and formatted account results in at least one failed set of masks (either payee or eBill or both), then use the trimmed account against the payee and eBill account masks (second pass) to get the end result: |
| | If the customer's account passes the payee account masks for any BPP, and the account passes the eBill account mask, display screen 4a. |
| | If the account fails all BPP payee masks and the eBill account mask, redisplay screen 7. |
| | If the account passes any of the BPP payee account masks, and fails the eBill account masks, display screen 7 (payee will be added as a pick list payee if customer wishes to proceed adding payee on screen 7). |
| | If the account passes the payee account masks for the second or lower order BPP, and the account fails the eBill account mask, display screen 7 (payee will be added as a pick list payee if customer wishes to proceed adding payee on screen 7). |
| | If the account passes the payee account masks for the second or lower order BPP, and passes the eBill account mask, display screen 4a. |
| | The scenario where an account fails all BPP payee account masks and passes the eBill account mask should never occur. |
| "Proceed with this account number" button | Restricted Merchant |
| | Use the results of the last pass before the display of screen 6 to determine navigation: |
| | If the account passes the payee account masks for the first order BPP, and passes the eBill account mask, display screen 4a. |
| | If the account fails all BPP payee masks and fails the eBill account mask, redisplay screen 6. |
| | If the account passes the payee account masks for the first order BPP, and fails the eBill account mask, display screen 7 (payee will be added as a pick list payee if customer wishes to proceed adding payee on screen 7). |
| | The scenario where an account fails all BPP payee account masks and passes the eBill account mask should never occur. |
| | Unrestricted Merchant |
| | Use the results of the last pass before the display of screen 6 to determine navigation: |
| | If the customer's account passes the payee account masks for any BPP, and the account passes the eBill account mask, display screen 4a. |
| | If the account fails all BPP payee masks and the eBill account mask, redisplay screen 6. |
| | If the account passes any of the BPP payee account masks, and fails the eBill account masks, display screen 7 (payee will be added as a pick list payee if customer wishes to proceed adding payee on screen 7). |
| | The scenario where an account fails all BPP payee account masks and passes the eBill account mask should never occur. |

Reporting

In one embodiment of the invention, to manage the updating of the account number handling rules, more specifically the regular expressions that are employed to drive them, a report is developed and provided to monitor required changes in merchant account number handling rules.

The report provides relevant merchant eBiller information to Bill Pay administrator system(s) relating to specific eBill account mask failures and the account number handling rules. The report allows the Bill Pay administrator to analyze changes to eBiller account masks that may require updates to the defined account number handling rules for the Merchant in question.

An Example Report Name

An example of a report name is EBILL ACCOUNT MASK—REGULAR EXPRESSION FAILURE REPORT.

Report Definition

In one embodiment of the invention, the report is defined as follows, i.e. title and content definitions of each column of the report. BSP stands for Biller Service Provider, as shown hereinbelow in Table JJ.

TABLE JJ

| Column # | Column Title | Column Definition |
|---|---|---|
| 1 | BSP ID | The BSP ID for the bill service provider |
| 2 | BSP Name | The BSP Name for the bill service provider |
| 3 | Merchant Name | The name of the Merchant for the eBiller in queston |
| 4 | Merchant ID | The ID of the Merchant |
| 5 | Current Format Rule for eBiller | The current extracting and formatting regular expression for the Merchant. |
| 6 | BLRMSK | eBiller account mask(s) |
| 7 | eBiller-test account number pre-formatting | The test account number as it is stored prior to any account number handling rules being applied |
| 8 | eBiller-test account number post-formatting | The test account number as it appears after all account number handling rules have been applied, i.e. the account number that fails the test |
| 9 | what account mask(s) failed? | A list of the failed account masks, Payee and/or eBill |
| 10 | Date | Date in which the report is run in mm/dd/yyyy format. |

Report Sample

Following in Table KK is a sample eBill Account Mask Report according to one embodiment of the invention.

TABLE KK

EBILL ACCOUNT MASK - REGULAR EXPRESSION FAILURE REPORT
Report Date - MM-DD-YYYY

| Merchant Name | Merchant ID | Current eBiller Rule | BLRMSK (eBill Account Mask) | eBiller-test account number pre-formatting | eBiller-test account number post-formatting | what account mask(s) failed? |
|---|---|---|---|---|---|---|
| BSP ID - 107 BSP Name - Checkfree | | | | | | |
| Sample Merchant 1 | 1026 | Upper Case Rule: N/A Extract Regular Expression ^[0-9]*([0-9]{4})[0-9]*([0-9]{4})[0-9]*([0-9]{4})[0-9]*([0-9]{4}).*$ Format: $1 $2 $3 $4 | ^\d{4}-\d{4}-\d{4}-\d{4}$ | 6018999953319999 | 6018 9999 5331 9999 | eBill |
| BSP ID - BSP2 BSP Name - BSP2 Name | | | | | | |
| Sample Merchant 2 | 5233 | Upper Case Rule: N/A Extract Regular Expression ^[0-9]*([0-9]{3})[0-9]*([0-9]{4})[0-9]*([0-9]{2})[0-9]*([0-9]{1}).*$ Format: $1-$2-$3-$4 | ^\d{3}\ \d{4}\ \d{2}\ \d{1}$ | 1234567890 | 123-4567-89-0 | eBill |

For Sample Merchant 1, the test account number failed the eBill account mask due to the Merchant making a change from inserting hyphens between the number sets rather than the account number handling rule defined spaces.

For Sample Merchant 2, the test account number failed the eBill account mask due to the Merchant making a change from inserting spaces between the number sets rather than the account number handling rule defined hyphens.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A computer implemented method implemented by an electronic payment system over the Internet, the method comprising the steps of:

storing, by the electronic payment system, account number cleansing instructions for a payee, the account number cleansing instructions corresponding to one or more account handling rules to modify received account numbers based on specifications of a payee mask for the payee and an ebill mask for the same payee that is different from the payee mask, the account handling rules comprising one or more regular expression formulas to extract and format the received account numbers for passing the payee mask and the ebill mask;

displaying, by the electronic payment system, a first screen on a user device, the first screen prompting a customer of the user device to add a new payee and an account number corresponding to the customer and associated with the new payee;

receiving, by the electronic payment system from the user device, the account number, a payee name, and an indicated purpose for adding the new payee, the indicated purpose corresponding to one of the remittance processing only or the combined remittance processing and electronic bill presentment;

determining that the indicated purpose for adding the new payee corresponds to the combined remittance processing and electronic bill presentment;

determining that the account number received from the user device does not match at least one of the payee mask and the ebill mask of acceptable account numbers in response to determining that the indicated purpose corresponds to the combined remittance processing and electronic bill presentment;

displaying, by the electronic payment system, a second screen on the user device prompting the customer to re-enter the account number in response to:

determining that a cleansed account number matches the payee mask, the cleansed account number corresponding to the received account number that is modified and formatted according to the one or more account handling rules and the one or more regular expression formulas;

determining that the cleansed account number does not match the ebill mask; and determining that a trimmed account number does not match the ebill mask, the trimmed account number corresponding to the received account number or the cleansed account number with leading and/or trailing spaces removed;

receiving, by the electronic payment system, a re-entered account number from the user device in response to the prompting via the second screen displayed on the user device; and activating, by the electronic payment system, electronic bill presentment for the customer based on the re-entered account number.

2. The computer implemented method of claim 1, wherein the account number cleansing instructions are defined at a merchant level.

3. The computer implemented method of claim 1, further comprising the step of:
using either said cleansed or trimmed account number to determine an optimal route for remittances.

4. The computer implemented method of claim 1, wherein the account handling rules of the account cleansing instructions comprise any combination of the following operations:
changing the case of the characters to either upper or lower case;
using the syntax of a regular expression, as follows:
to define the set of valid characters;
all others are removed; or
to describe the elements of an account number that the system searches for and extracts, that is discarding all other input, as well as how to reassemble and format the resulting elements into an account number; and adding characters, as follows:
specifying a character to pad with, including padding to the right or padding to the left, and specifying the target length of the resulting account number; or
specifying a set of characters and whether to use as a prefix or suffix.

5. The computer implemented method of claim 1, further comprising the step of:
using as input that which the customer entered and using said input as a flexible string variable and associating said string to a merchant in a list of merchants for electronic remittances.

6. The computer implemented method of claim 1, further comprising the step of:
moving a payee to another payment processor without customer intervention.

7. The computer implemented method of claim 1, further comprising the step of:
providing a tool for an administrator that manages merchant information of merchants in a pick list, said information comprising:
addresses;
account masks; and
multiple payment processors.

8. The method of claim 1, wherein the account number cleansing instructions produces a first regular expression format of the account number corresponding to a remit account number, and a second regular expression format of the account number corresponding to an ebiller account number.

9. The method of claim 1, wherein the payee mask corresponds to remittance processing to the payee, and the ebill mask corresponds to activating electronic bill presentment from the payee.

* * * * *